(12) United States Patent
Ju et al.

(10) Patent No.: US 12,535,477 B2
(45) Date of Patent: Jan. 27, 2026

(54) SINGLE-MOLECULE ELECTRONIC MULTIPLEX NANOPORE IMMUNOASSAYS FOR BIOMARKER DETECTION

(71) Applicant: The Trustees of Columbia University in the City of New York, New York, NY (US)

(72) Inventors: Jingyue Ju, Englewood Cliffs, NJ (US); James J. Russo, New York, NY (US); Sergey Kalachikov, Bronx, NY (US); Chuanjuan Tao, Fort Lee, NJ (US); Shiv Kumar, Belle Meade, NJ (US); Irina Morozova, Bronx, NY (US); Xiaoxu Li, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 1211 days.

(21) Appl. No.: 17/156,079

(22) Filed: Jan. 22, 2021

(65) Prior Publication Data
US 2021/0199641 A1    Jul. 1, 2021

Related U.S. Application Data

(63) Continuation of application No. PCT/US2019/042864, filed on Jul. 22, 2019.

(60) Provisional application No. 62/701,990, filed on Jul. 23, 2018.

(51) Int. Cl.
G01N 27/327    (2006.01)
G01N 33/487    (2006.01)
G01N 33/68    (2006.01)

(52) U.S. Cl.
CPC ... *G01N 33/48721* (2013.01); *G01N 33/6857* (2013.01)

(58) Field of Classification Search
CPC ............... G01N 33/48721; G01N 33/6857
See application file for complete search history.

(56) References Cited

U.S. PATENT DOCUMENTS

| 2014/0134616 A1 * | 5/2014 | Davis ............... C12Q 1/6869 568/672 |
| 2014/0262784 A1 | 9/2014 | Clarke et al. |

(Continued)

FOREIGN PATENT DOCUMENTS

| CN | 105102627 B | 10/2018 | |
| WO | WO 2017004463 A1 * | 1/2017 | ............. G01N 33/53 |

(Continued)

OTHER PUBLICATIONS

"Energy Education—Grp[hene]", author unknown, downloaded Oct. 2, 2023 from https://energyeducation.ca/encyclopedia/Graphene (Year: 2023).*

(Continued)

*Primary Examiner* — Alexander S Noguerola
(74) *Attorney, Agent, or Firm* — Gary J. Gershik

(57) ABSTRACT

The present application discloses novel and inventive methods, apparatuses, and the required molecules to detect compounds (analytes) utilizing antibodies or other protein-binding molecules and nanopore-detectable tags using specially designed nanopores, coupled with ionic current readout, to provide a single molecule electronic detection solution, offering unique opportunities for multiplexing and quantitation.

20 Claims, 25 Drawing Sheets

(56) References Cited

U.S. PATENT DOCUMENTS

2015/0111759 A1  4/2015  Ju et al.
2016/0041179 A1  2/2016  Ju et al.
2018/0045668 A1  2/2018  Paik et al.
2018/0073071 A1  3/2018  Ju et al.

FOREIGN PATENT DOCUMENTS

WO  WO 2017/075620 A1  5/2017
WO  WO 2020/023405 A1  1/2020

OTHER PUBLICATIONS

Beqqali et al., "Electrical properties of molybdenum disulfide MoS2, Experimental study and density functional calculation results," Synthetic Metal 90 (1997) 165-172 (Year: 1997).*
International Preliminary Report on Patentability issued Jan. 26, 2021, including Written Opinion of the International Searching Authority issued Oct. 28, 2019, in connection with PCT/US2019/042864.
International Search Report issued Oct. 28, 2019 in connection with PCT International Application No. PCT/US2019/042864.
Written Opinion of the International Searching Authority issued Oct. 28, 2019 in connection with PCT International Application No. PCT/US2019/042864.
Wei et al., "Stochastic sensing of proteins with receptor-modified solid-state nanopores", Apr. 2012, vol. 7, pp. 257-263.
Chuah et al., "Nanopore blockade sensor for ultrasensitive detection of proteins in complex biological samples", Oct. 2019, 10:2109.
Chinese Office Action and English Google Translation thereof issued Dec. 27, 2023 in connection with CN 201980062043.3.

* cited by examiner

Azo Linker
Na$_2$S$_2$O$_4$-cleavable
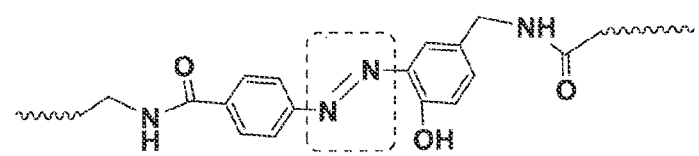
Ketal Linker
Acid-cleavable
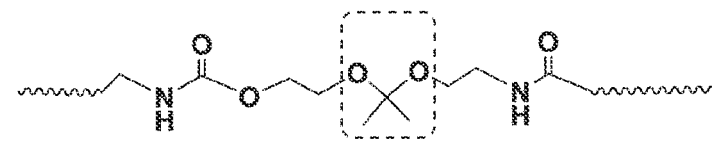
Diol Linker
NaIO$_4^-$cleavable
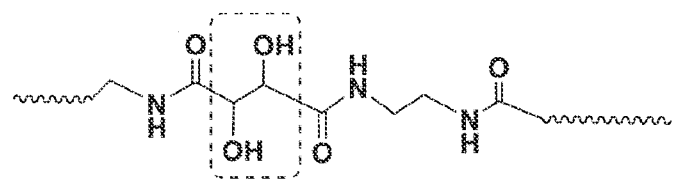
Allyl Linker
Pd-cleavable
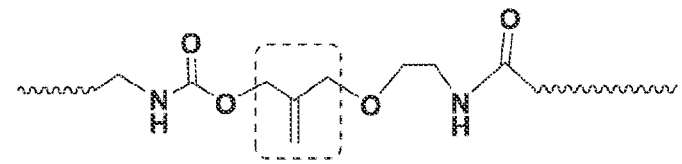
Photocleavable Linker
UV Light-cleavable
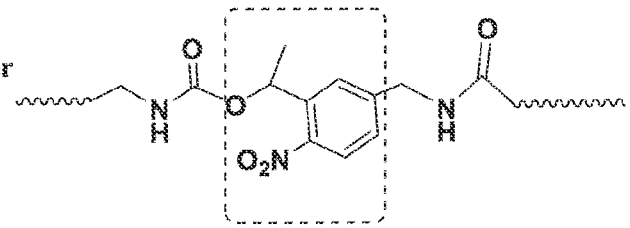
Cleavable linkers for attachment to antibodies and Tags
Fig. 17

SINGLE-MOLECULE ELECTRONIC MULTIPLEX NANOPORE IMMUNOASSAYS FOR BIOMARKER DETECTION

CROSS-REFERENCE TO RELATED APPLICATIONS

This application is a continuation of PCT International Application No. PCT/US2019/042864, filed Jul. 22, 2019, claiming the benefit of U.S. Provisional Application No. 62/701,990, filed Jul. 23, 2018, the entire contents of each of which are hereby incorporated by reference into the subject application.

Throughout this application, various publications and patents are referenced. Full citations for these references may be found at the end of the specification immediately preceding the claims. The disclosures of these publications and patents in their entirety are hereby incorporated by reference into this application to more fully describe the state of the art to which this invention pertains.

BACKGROUND

The ability to detect proteins, carbohydrates, nucleic acids, small molecules and other compounds from tissue biopsies or non-invasively (e.g., from blood and urine) is becoming more and more important, particularly those recognized as biomarkers for cancers and other diseases. These biomarkers can be tracked over time in individuals in an attempt to diagnose diseases at early stages, compared in different tissues, individuals or populations, and examined before, during and after treatments. U.S. 2016/0041179 A1, Ju et al., described a novel method to detect compounds (analytes) utilizing antibodies or other protein-binding molecules and nanopore-detectable tags. The use of nanopores, coupled with ionic current readout, provides a single molecule electronic detection solution, offering unique opportunities for multiplexing and quantitation. The latter is more sensitive than current immunological methods, including ELISAs (enzyme linked immunosorbent assays), RIAs (radioimmunoassays) and protein arrays, and less expensive than methods with mass spectrometric (MS) readout (direct application of samples to MS or tandem MS, or carrying out MS after initial 2-D gel separation, ICAT or other procedures). In addition to the use of antibodies to detect and quantify antigenic compounds, the approach can also be adapted to identify ligand-receptor and other protein-protein interactions, as well as a variety of other molecular interactions. Thus, for instance, the system would have the flexibility to monitor both DNA and protein or other biomarkers at the same time.

The focus in U.S. 2016/0041179 A1 is, in part, on attaching nanopore-detectable tags to specific analytes (antigens or other molecules) using a variety of approaches. The overall approach was described as follows: (1) capture antibodies, affibodies or other antibody mimetics, aptamers or ligands specific for a particular analyte (compound) are bound to (or very near) individual membrane-embedded nanopores in a nanopore array; (2) the tagged compounds are flowed over the nanopore array in an electrolyte solution and bind to the specific antibodies; and (3) after applying a voltage across the membranes, current recordings are taken, allowing identification of the compound associated with a well containing a specific nanopore. Tags are attached via cleavable linkers in some embodiments. Different tags attached to different compounds will elicit different current blockades, allowing determination of multiple compounds on the same nanopore array at single molecule level. With sufficient numbers of nanopores, quantitative or semi-quantitative results can be obtained. (See U.S. 2016/0041179 A1, which describes the principle of this method).

This application comprises several new embodiments using the single molecule electronic nanopore platform to detect biomarkers, other biological molecules, antigens, antibodies, and a variety of molecular interactions. Several examples involve the use of a tagged second antibody (detection antibody) that can bind to a different site on the same analyte as the initial capture antibody, or to a binding partner of the original molecule attracted by the capture antibody.

SUMMARY OF THE INVENTION

The invention provides a method for detecting the presence of a compound of interest in a sample, which comprises:
- a) binding a capture compound or multiple copies of said capture compound for the compound of interest to or near a nanopore;
- b) inserting the nanopore into an electrically resistive barrier;
- c) contacting the capture compound or multiple copies of said capture compound with the sample containing the compound of interest under conditions permitting the compound of interest to attach to the capture compound;
- d) contacting the compound of interest with a tagged compound or multiple copies of said tagged compound under conditions permitting the tagged compound to attach to the compound of interest, wherein the tagged compound comprises at least one tag;
- e) contacting the nanopore with an electrolyte solution and applying a voltage across the electrically resistive barrier; and
- f) measuring the electronic signal change across the pore resulting from at least one tag of the tagged compound entering the nanopore, thereby detecting the presence of the compound of interest.

The invention provides a method of detecting the presence of a compound of interest in a sample, which comprises:
- a) contacting a nanopore with a magnetic bead comprising multiple copies of a capture compound for the compound of interest attached thereto and a binding compound 2 for attachment of the magnetic bead to or near the nanopore via binding compound 1, wherein the binding compound 1 is attached to or near the nanopore, under conditions permitting the magnetic bead to attach to or near the nanopore;
- b) inserting the nanopore into an electrically resistive barrier;
- c) contacting the capture compounds on the bead with a sample containing the compound of interest under conditions permitting the compound of interest to bind to the capture compounds;
- d) contacting the compound of interest with a tagged compound under conditions permitting the tagged compound to attach to the compound of interest, wherein the tagged compound comprises at least one tag;
- e) contacting the nanopore with an electrolyte solution and applying a voltage across the electrically resistive barrier; and f) measuring the electronic signal change across the pore resulting from at least one tag of the tagged compound entering the nanopore, thereby detecting the presence of the compound of interest.

The invention provides a method for determining the presence and/or relative quantities of a plurality of different compounds of interest in a sample, which comprises:
a) contacting a plurality of nanopores with a plurality of different capture compounds,
   wherein each type of capture compound binds to a different type of compound of interest in the sample,
   under conditions such that each capture compound binds to or near one of the plurality of nanopores;
b) inserting the plurality of nanopores in an electrically resistive barrier;
c) contacting the plurality of different capture compounds with the sample comprising the plurality of different compounds of interest under conditions permitting each compound of interest to bind to a capture compound;
d) contacting the plurality of different compounds of interest with a plurality of different tagged compounds,
   wherein each type of tagged compound binds to a different type of compound of interest,
   wherein each type of tagged compound comprises at least one tag,
   wherein each type of tagged compound comprises a different type of tag from each other type of tagged compound,
   wherein the identity of each type of tagged compound is correlated to a type of tag,
   under conditions such that each tagged compound binds to a compound of interest;
e) contacting the plurality of nanopores with an electrolyte solution and applying a voltage across the electrically resistive barrier;
f) measuring the electronic signal change across each of the plurality of nanopores resulting from at least one tag of each of the tagged compounds entering the nanopore; and
g) optionally comparing the relative number of each type of tag so detected by a nanopore;

thereby determining the presence and/or relative quantities of the plurality of different compounds of interest in the sample.

The invention provides a method for determining the presence and/or relative quantities of a plurality of different compounds of interest in a sample, which comprises:
a) contacting the plurality of nanopores with a plurality of different capture compounds,
   wherein each type of capture compound binds to a different type of compound of interest in the sample,
   wherein each type of capture compound comprises at least one tag,
   wherein each type of capture compound comprises a different type of tag from each other type of capture compound,
   wherein the identity of each type of capture compound is correlated to a type of tag,
   under conditions such that each capture compound binds to or near one of the plurality of nanopores;
b) inserting the plurality of nanopores in an electrically resistive barrier;
c) contacting the plurality of nanopores with an electrolyte solution and applying a voltage across the electrically resistive barrier;
d) measuring the electronic signal change across each of the plurality of nanopores resulting from at least one tag of each of the capture compounds entering a nanopore, thereby determining the identity of the capture compound attached near or to each nanopore;
e) contacting the plurality of different capture compounds with the sample comprising the plurality of different compounds of interest,
   wherein each compound of interest has the same type of tag attached thereto,
   under conditions permitting each compound of interest to bind to a capture compound;
f) contacting the plurality of nanopores with an electrolyte solution and applying a voltage across the electrically resistive barrier;
g) measuring the electronic signal change across each of the plurality of nanopores resulting from the tag of each of the compounds of interest entering the nanopore; and
h) optionally comparing the relative number of tags detected by a nanopore;

thereby determining the presence and/or relative quantities of the plurality of different compounds of interest in the sample.

The invention provides a method for determining a molecular interaction of a biological molecule comprising:
a) attaching the biological molecule or multiple copies of said biological molecule to or near a nanopore;
b) inserting the nanopore in an electrically resistive barrier;
c) contacting the biological molecule with a sample containing putative interacting compound under conditions such that the biological molecule and putative interacting compound interact, and optionally performing a cross-linking step to bind the biological molecule and putative interacting compound;
d) contacting the putative interacting compound with a tagged compound, wherein the tagged compound comprises at least one tag, under conditions permitting the tagged compound to bind to the putative interacting compound;
e) contacting the nanopore with an electrolyte solution and applying a voltage across the electrically resistive barrier; and
f) measuring the electronic signal change across the pore resulting from at least one tag of the tagged compound entering the nanopore, thereby detecting the molecular interaction of a biological molecule.

DESCRIPTION OF FIGURES

FIG. 17: Cleavable Linkers for Attachment of Nanopore Tags to Antibodies or Other Molecules. Five examples of cleavable groups that can be installed in the linkers connecting tags to detection antibodies or other detection molecules are shown here, along with the chemical agents that can be used to cleave the linkers at these positions, while leaving proteins intact.

DETAILED DESCRIPTION OF THE INVENTION

Figure 1:
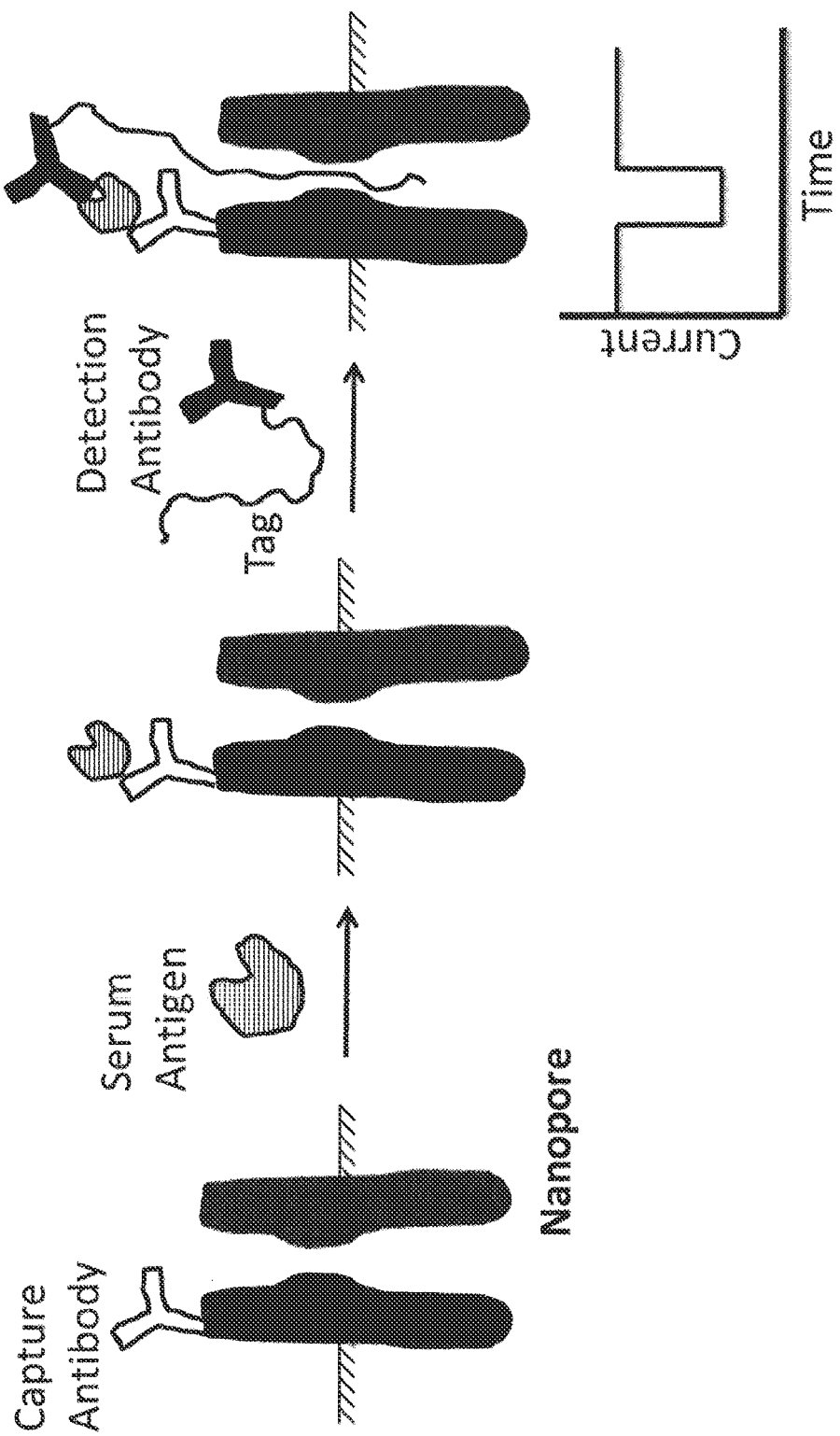
FIG. 1: Basic protocol for detecting proteins by nanopore sensing. (1) Capture antibody (referred to as $1^{st}$ antibody or antibody 1 in the text) is conjugated to the nanopore embedded in a membrane. The target protein (also referred to as antigen or analyte in the text) is captured by the antibody. (2) A second Nano-Tag Detection Antibody (also referred to as tagged $2^{nd}$ antibody or tagged antibody 2 in the text) containing a nanopore-distinguishable tag binds to the target protein. When a voltage is applied across the membrane, the tag enters the channel of the nanopore, and the resulting ionic current blockade, specific to the tag, indicates the capture and thus identification of the target protein. In variations of this basic protocol, antibodies can be replaced by antibody mimetics, and targets may be non-protein molecules. While a single capture antibody is shown here, multiple copies of the capture antibody or small antibody mimetics may be attached to or near the nanopore.

The invention provides a method for detecting the presence of a compound of interest in a sample, which comprises:
a) binding a capture compound or multiple copies of said capture compound for the compound of interest to or near a nanopore;
b) inserting the nanopore into an electrically resistive barrier;
c) contacting the capture compound or multiple copies of said capture compound with the sample containing the compound of interest under conditions permitting the compound of interest to attach to the capture compound;
d) contacting the compound of interest with a tagged compound or multiple copies of said tagged compound under conditions permitting the tagged compound to attach to the compound of interest, wherein the tagged compound comprises at least one tag;
e) contacting the nanopore with an electrolyte solution and applying a voltage across the electrically resistive barrier; and
f) measuring the electronic signal change across the pore resulting from at least one tag of the tagged compound entering the nanopore,
thereby detecting the presence of the compound of interest.

In an embodiment of the invention, step c) occurs prior to step a).

In an embodiment of the invention, step d) occurs prior to step c).

In an embodiment of the invention, step b) occurs prior to step a).

The invention provides a method of detecting the presence of a compound of interest in a sample, which comprises:
a) contacting a nanopore with a magnetic bead comprising multiple copies of a capture compound for the compound of interest attached thereto and a binding compound 2 for attachment of the magnetic bead to or near the nanopore via binding compound 1, wherein the binding compound 1 is attached to or near the nanopore, under conditions permitting the magnetic bead to attach to or near the nanopore;

b) inserting the nanopore into an electrically resistive barrier;
c) contacting the capture compounds on the bead with a sample containing the compound of interest under conditions permitting the compound of interest to bind to the capture compounds;
d) contacting the compound of interest with a tagged compound under conditions permitting the tagged compound to attach to the compound of interest, wherein the tagged compound comprises at least one tag;
e) contacting the nanopore with an electrolyte solution and applying a voltage across the electrically resistive barrier; and
f) measuring the electronic signal change across the pore resulting from at least one tag of the tagged compound entering the nanopore,
thereby detecting the presence of the compound of interest.

In an embodiment of the invention, step c) occurs before step a). In an embodiment of the invention, step d) occurs before step c). In an embodiment of the invention, step b) occurs before step a).

The invention provides a method for determining the presence and/or relative quantities of a plurality of different compounds of interest in a sample, which comprises:
a) contacting a plurality of nanopores with a plurality of different capture compounds,
  wherein each type of capture compound binds to a different type of compound of interest in the sample,
  under conditions such that each capture compound binds to or near one of the plurality of nanopores;
b) inserting the plurality of nanopores in an electrically resistive barrier;
c) contacting the plurality of different capture compounds with the sample comprising the plurality of different compounds of interest under conditions permitting each compound of interest to bind to a capture compound;
d) contacting the plurality of different compounds of interest with a plurality of different tagged compounds,
  wherein each type of tagged compound binds to a different type of compound of interest,
  wherein each type of tagged compound comprises at least one tag,
  wherein each type of tagged compound comprises a different type of tag from each other type of tagged compound,
  wherein the identity of each type of tagged compound is correlated to a type of tag,
  under conditions such that each tagged compound binds to a compound of interest;
e) contacting the plurality of nanopores with an electrolyte solution and applying a voltage across the electrically resistive barrier;
f) measuring the electronic signal change across each of the plurality of nanopores resulting from at least one tag of each of the tagged compounds entering the nanopore; and
g) optionally comparing the relative number of each type of tag so detected by a nanopore;
thereby determining the presence and/or relative quantities of the plurality of different compounds of interest in the sample.

The invention provides a method for determining the presence and/or relative quantities of a plurality of different compounds of interest in a sample, which comprises:
a) contacting the plurality of nanopores with a plurality of different capture compounds,
  wherein each type of capture compound binds to a different type of compound of interest in the sample,
  wherein each type of capture compound comprises at least one tag,
  wherein each type of capture compound comprises a different type of tag from each other type of capture compound,
  wherein the identity of each type of capture compound is correlated to a type of tag,
  under conditions such that each capture compound binds to or near one of the plurality of nanopores;
b) inserting the plurality of nanopores in an electrically resistive barrier;
c) contacting the plurality of nanopores with an electrolyte solution and applying a voltage across the electrically resistive barrier;
d) measuring the electronic signal change across each of the plurality of nanopores resulting from at least one tag of each of the capture compounds entering a nanopore, thereby determining the identity of the capture compound attached near or to each nanopore;
e) contacting the plurality of different capture compounds with the sample comprising the plurality of different compounds of interest,
  wherein each compound of interest has the same type of tag attached thereto,
  under conditions permitting each compound of interest to bind to a capture compound;
f) contacting the plurality of nanopores with an electrolyte solution and applying a voltage across the electrically resistive barrier;
g) measuring the electronic signal change across each of the plurality of nanopores resulting from the tag of each of the compounds of interest entering the nanopore; and
h) optionally comparing the relative number of tags detected by a nanopore;
  thereby determining the presence and/or relative quantities of the plurality of different compounds of interest in the sample.

In an embodiment of the invention, step b) occurs before step a).

In an embodiment of the invention, the tag attached to the capture compounds is cleaved after step d).

In an embodiment of the invention, the capture compound or multiple copies of said capture compound is attached to the nanopore. In an embodiment of the invention, the capture compound or multiple copies of said capture compound is attached near the nanopore. In an embodiment of the invention, the capture compound is an antibody. In an embodiment of the invention, the capture compound is an antibody mimetic. In an embodiment of the invention, the antibody mimetic is one of an affibody, avibody, affimer, nanoclamp, a pharmaceutical agent, or a small organic molecule.

In an embodiment of the invention, the tagged compound is an antibody. In an embodiment of the invention, the tagged compound is an antibody mimetic. In an embodiment of the invention, the antibody mimetic is one of an affibody, avibody, affimer, nanoclamp, a pharmaceutical agent, or a small organic molecule.

In an embodiment of the invention, the compound or compounds of interest is an antigen. In an embodiment of the invention, the antigen is one of a biomarker, protein, lipid, carbohydrate, DNA, a glycoprotein, a lipoprotein, virus particle, or other composite molecule.

The invention provides a method for determining a molecular interaction of a biological molecule comprising:
a) attaching the biological molecule or multiple copies of said biological molecule to or near a nanopore;
b) inserting the nanopore in an electrically resistive barrier;
c) contacting the biological molecule with a sample containing putative interacting compound under conditions such that the biological molecule and putative interacting compound interact, and optionally performing a cross-linking step to bind the biological molecule and putative interacting compound;
d) contacting the putative interacting compound with a tagged compound, wherein the tagged compound comprises at least one tag, under conditions permitting the tagged compound to bind to the putative interacting compound;
e) contacting the nanopore with an electrolyte solution and applying a voltage across the electrically resistive barrier; and
f) measuring the electronic signal change across the pore resulting from at least one tag of the tagged compound entering the nanopore,
thereby detecting the molecular interaction of a biological molecule.

In an embodiment of the invention, the step b) occurs before step a).

In an embodiment of the invention, the biological molecule or is attached to the nanopore via a flexible linker.

In an embodiment of the invention, the tag is attached to the tagged compound via a cleavable linker, and the tag is cleaved from the tagged compound after step d).

In an embodiment of the invention, the biological molecule is one of a biomarker, protein, lipid, carbohydrate, DNA, a glycoprotein, a lipoprotein, virus particle, or other composite molecule.

In an embodiment of the invention, the putative interacting molecule is one of a biomarker, protein, lipid, carbohydrate, DNA, glycoprotein, a lipoprotein, a virus particle (or other composite molecule.

In an embodiment of the invention, the tagged compound is one of a biomarker, protein, lipid, carbohydrate, DNA, a glycoprotein, a lipoprotein, a virus particle or other composite molecule.

In an embodiment of the methods described herein, the tag or tags comprises a polymeric molecule. In an embodiment of the invention, the polymeric molecule is a polymer comprising one or more of PEG, alkane, peptide, polypeptide, a polynucleotide, or any combination thereof. In an embodiment of the invention, the tag further comprises a modification expanding or reducing the diameter of the tag within the nanopore. In an embodiment of the invention, the tag further comprises a modification that changes the charge of the tag. In an embodiment of the invention, the tag comprises one or more of dSP, C3, $C_n$, PEG, pyrrolidine, spermine, spermidine, nitro pyrrole, nitro indole, nebulazine, benzimidazole, benzene, 7-deazapurine, 5-substituted pysrimidine, fluorescein-dT, fluorescein, rhodamine, ROX, cyanine dye, or any combination thereof.

In an embodiment of the methods described herein, the nanopore is a solid state nanopore, wherein step b) occurs before step a) or wherein step b) is omitted. In an embodiment of the methods described herein, the nanopore is a solid state nanopore, in which case the capture compound is attached to or near the nanopore in the first step. In an embodiment of the invention, the electrically resistive barrier comprises graphene, molybdenum disulfide, or silicon nitride.

In an embodiment of the methods described herein, the nanopore comprises a biological nanopore. In an embodiment of the invention, the nanopore is α-hemolysin. In an embodiment of the invention, the nanopore is α-hemolysin, MspA, or OmpG, or FraC, or Aerolysin, or other transmembrane pore complex of beta-barrel class, or transmembrane pore complex of other class. In an embodiment of the invention, the electrically resistive barrier is a lipid bilayer.

In an embodiment of the invention, the nanopore is a hybrid protein-solid state nanopore.

In an embodiment of the invention, the nanopore comprises an integrated electronic sensor.

As used herein, and unless stated otherwise, each of the following terms shall have the definition set forth below.

"Antibody" shall include, without limitation, (a) an immunoglobulin molecule comprising two heavy chains and two light chains and which recognizes an antigen; (b) a polyclonal or monoclonal immunoglobulin molecule; and (c) a monovalent or divalent fragment thereof. Immunoglobulin molecules may derive from any of the commonly known classes, including but not limited to IgA, secretory IgA, IgG, IgE and IgM. IgG subclasses are well known to those in the art and include, but are not limited to, human IgG1, IgG2, IgG3 and IgG4. Antibodies can be both naturally occurring and non-naturally occurring. Furthermore, antibodies include chimeric antibodies, wholly synthetic antibodies, single chain antibodies, and fragments thereof. Antibodies may be human or nonhuman. Antibody fragments include, without limitation, Fab fragments, Fv fragments and other antigen-binding fragments.

"Nanopore" includes, for example, a structure comprising (a) a first and a second compartment separated by a physical barrier, which barrier has at least one pore with a diameter, for example, of from about 1 to 10 nm, and (b) a means for applying an electric field across the barrier so that a charged molecule such as DNA, nucleotide, nucleotide analogue, or tag, can pass from the first compartment through the pore to the second compartment. The nanopore ideally further comprises a means for measuring the electronic signature of a molecule passing through its barrier. The nanopore barrier may be synthetic or naturally occurring in part. Barriers can include, for example, lipid bilayers having therein α-hemolysin, oligomeric protein channels such as porins, and synthetic peptides and the like. Barriers can also include inorganic plates having one or more holes of a suitable size. Herein "nanopore", "nanopore barrier" and the "pore" in the nanopore barrier are sometimes used equivalently. It is understood that the electric field of a nanopore may be adjustable. It is also understood that a charged molecule such as DNA, nucleotide, nucleotide analogue, or tag, does not need to pass from the first compartment through the pore to the second compartment in order to produce an electronic signature. Such electronic signature may be produced by localization of the molecule within the pore.

Nanopore devices are known in the art and nanopores and methods employing them are disclosed in U.S. Pat. Nos. 7,005,264; 7,846,738; 6,617,113; 6,746,594; 6,673,615; 6,627,067; 6,464,842; 6,362,002; 6,267,872; 6,015,714; 5,795,782; and U.S. Publication Nos. 2004/0121525, 2003/0104428, and 2003/0104428, each of which are hereby incorporated by reference in their entirety.

"Blockade signature" of a molecule passing through a pore via application of an electronic field (e.g., applied voltage) shall include, for example, the duration of the molecular tag's passage through the pore together with the observed amplitude of current during that passage. Blockade signature for a molecule is envisioned and can be, for example, a plot of current (e.g. pA) versus time for the molecule to pass through the pore via application of an electric field. Alternatively, blockade signature is also determinable for a molecule which does not pass through a pore. Blockade signature of such a molecule is also envisioned and can be, for example, a plot of current (e.g. pA) versus time for the molecule to enter into or pass adjacent to the pore. Herein "blockade signature", "blockade signal", and "electronic signature" are sometimes used equivalently. Herein, "voltage" and "electronic field" are sometimes used equivalently.

A specific event diagram is constructed which is the plot of translocation time versus blockade current. This specific event diagram (also referred to as an blockade signature) is used to distinguish molecules by single-channel recording techniques based on characteristic parameters such as translocation current, translocation duration, and their corresponding dispersions in the diagram.

As used herein, a "tag" or a "tag moiety" is any chemical group or molecule that is capable of producing a unique blockade signature detectable with a nanopore. In some cases, a tag comprises one or more of ethylene glycol, an amino acid, a carbohydrate, a peptide, a dye, a fluorescent compound, a chemiluminiscent compound, a mononucleotide, a dinucleotide, a trinucleotide, a tetranucleotide, a pentanucleotide, a hexanucleotide, a polynucleotide, a nucleotide monophosphate, a nucleotide diphosphate, a nucleotide polyphosphate, an aliphatic acid, an aromatic acid, an unsubstituted alcohol or thiol, an alcohol or a thiol substituted with one or more halogens, a cyano group, a nitro group, an alkyl group, an alkenyl group, an alkynyl group, an azido group, or a combination thereof.

As used herein, unless otherwise specified, a tag moiety which is different or distinguishable from the tag moiety of a referenced molecule means that the tag moiety has a different chemical structure from the chemical structure of the other/referenced tag moiety. That a tag moiety is different or distinguishable from the tag moiety of a referenced molecule could also mean that the tag moiety has a different blockade signature from the blockade signature of the other/referenced tag moiety.

As used herein, a tag which "localizes" within a pore is a tag located inside or adjacent to the pore. A tag which localizes within a pore does not necessarily pass through or translocate the pore.

As used herein, "proteinaceous" compound means any biopolymer formed from amino acids, such as peptides, proteins, antibodies, antigens, or a fragment or portion thereof. Such compound may be naturally occurring or non-naturally occurring.

As used herein, "alkyl" includes both branched and straight-chain saturated aliphatic hydrocarbon groups having the specified number of carbon atoms and may be unsubstituted or substituted. Thus, C1-Cn as in "C1-Cn alkyl" includes groups having 1, 2, . . . , n−1 or n carbons in a linear or branched arrangement. For example, a "C1-C5 alkyl" includes groups having 1, 2, 3, 4, or 5 carbons in a linear or branched arrangement, and specifically includes methyl, ethyl, n-propyl, isopropyl, n-butyl, t-butyl, and pentyl.

As used herein, "alkenyl" refers to a non-aromatic hydrocarbon group, straight or branched, containing at least 1 carbon to carbon double bond, and up to the maximum possible number of non-aromatic carbon-carbon double bonds may be present, and may be unsubstituted or substituted. For example, "C2-C5 alkenyl" means an alkenyl group having 2, 3, 4, or 5, carbon atoms, and up to 1, 2, 3, or 4, carbon-carbon double bonds respectively. Alkenyl groups include ethenyl, propenyl, and butenyl.

The term "alkynyl" refers to a hydrocarbon group straight or branched, containing at least 1 carbon to carbon triple bond, and up to the maximum possible number of non-aromatic carbon-carbon triple bonds may be present, and may be unsubstituted or substituted. Thus, "C2-C5 alkynyl" means an alkynyl group having 2 or 3 carbon atoms and 1 carbon-carbon triple bond, or having 4 or 5 carbon atoms and up to 2 carbon-carbon triple bonds. Alkynyl groups include ethynyl, propynyl and butynyl.

The term "substituted" refers to a functional group as described above such as an alkyl, or a hydrocarbyl, in which at least one bond to a hydrogen atom contained therein is replaced by a bond to non-hydrogen or non-carbon atom, provided that normal valencies are maintained and that the substitution(s) result(s) in a stable compound. Substituted groups also include groups in which one or more bonds to a carbon(s) or hydrogen(s) atom are replaced by one or more bonds, including double or triple bonds, to a heteroatom. Non-limiting examples of substituents include the functional groups described above, and for example, N, e.g. so as to form —CN.

It is understood that substituents and substitution patterns on the compounds of the instant invention can be selected by one of ordinary skill in the art to provide compounds that are chemically stable and that can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

In choosing the compounds of the present invention, one of ordinary skill in the art will recognize that the various substituents, i.e. $R_1$, $R_2$, etc. are to be chosen in conformity with well-known principles of chemical structure connectivity.

In the compound structures depicted herein, hydrogen atoms, except on ribose and deoxyribose sugars, are generally not shown. However, it is understood that sufficient hydrogen atoms exist on the represented carbon atoms to satisfy the octet rule.

Where a range of values is provided, unless the context clearly dictates otherwise, it is understood that each intervening integer of the value, and each tenth of each intervening integer of the value, unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding (i) either or (ii) both of those included limits are also included in the invention.

The use of the terms first and second antibody ($1^{st}$ and $2^{nd}$ antibody; antibody 1 and 2; capture antibody and detection antibody), are not equivalent to primary and secondary antibody, which do not generally apply to methods disclosed herein, except for example 8. Secondary antibodies are antibodies raised to the primary antibody, which is in turn raised to the antigen of interest. In the subject application, first and second antibodies are both raised to the same antigenic protein or other molecule, or to two interacting molecules.

Target, target molecule, antigen, antigenic molecule, and biomarker are used interchangeably in this document. The exception is examples 8 and 12, where the target is the antibody or an antigen-antibody complex, not just the antigen. It should be understood that some antigens of interest may not be established as biomarkers, and some biomarkers may not be antigenic, but may have binding partners that can be used in this approach. Analyte is an additional term that is sometimes used to refer to the target molecule.

Herein, the term composite molecule is taken to include any molecular compound, such as a lipoprotein or glycoprotein, or complex including but not limited to a protein complex and a complete virion.

Some embodiments of the invention disclosed herein include tagging of a second antibody (detection antibody) that can bind to a different epitope on the same analyte as the initial antibody.

All combinations of the various elements described herein are within the scope of the invention. All sub-combinations of the various elements described herein are also within the scope of the invention.

This invention will be better understood by reference to the Experimental Details which follow, but those skilled in the art will readily appreciate that the specific experiments detailed are only illustrative of the invention as described more fully in the claims which follow thereafter.

Experimental Details and Discussion

As a general case, outlined in FIG. 1, and described more fully in Example 7, the procedure would be as follows: (1) capture antibodies, affibodies or other antibody mimetics, aptamers or ligands specific for a particular analyte (compound) would be bound to (or very near) individual membrane-embedded nanopores in a nanopore array; (2) the sample containing the analytes to be identified will be flowed over the nanopore array and bind to the specific capture antibodies or antibody mimetics; (3) the tagged second antibodies (or affibodies or other antibody mimetics, aptamers or ligands specific for a particular analyte (compound)) would be flowed over the nanopore array in an electrolyte solution and bind to a different site on the analyte, in a version of an antibody sandwich technique; and (4) after applying a voltage across the membranes, current recordings would be taken, allowing identification of the compound associated with a well containing a specific nanopore. The concept can be further expanded to a format where the reaction steps (1-3) related to binding the biomarker are performed in solution phase, and then the enriched nanopore-antibody-biomarker-tagged antibody complexes are applied to a nanopore array and assessed at the single-molecule level.

Different tags attached to second antibodies for different analytes would elicit different current blockades, allowing determination of multiple targets on the same nanopore array. With sufficient numbers of nanopores, quantitative or semi-quantitative results can be obtained (FIG. 1).

U.S. 2016/0041179 A1, Ju et al., described the covalent attachment of a specific tag to a specific analyte (compound of interest). This tagging is carried out prior to flowing the analytes over the chip. In a novel approach disclosed herein, tagged second antibodies (detection antibodies) are used, in combination with capture antibodies to the same target, resulting in a flexible approach for single molecule detection by nanopore allowing various multiplex and quantitation strategies. As long as multiple (or even the same) antibodies are available for a protein biomarker that bind to it at different epitopes, no special sample preparation is required. Unlike protein arrays, where binding of antibodies to a surface may reduce their ability to bind antigen, attachment of the first antibody to a nanopore via a flexible linker should preserve its ability to bind to its antigen. Moreover, the resulting complex should be readily accessible to the tagged second antibody. The invention disclosed herein retains all the advantages of a nanopore-based approach, including: (1) single-molecule electronic readout, resulting in rapid speed and high accuracy; (2) high throughput due to parallelization of reads on many nanopores; (3) multiplexing based on the ability to easily discriminate multiple tags and to take advantage of multiple flow cells; (4) ability to quantify protein biomarker levels due to the digital nature of the output (essentially counting electronic readings on a multiplicity of nanopores); and (5) small instrument size and cost. Compared with immunodetection methods based on fluorescent tags, the method can provide a substantially higher sensitivity and dynamic range.

Variations on the above general approach may include the attachment of multiple capture antibodies or small antibody mimetics (e.g., affibodies, Avibodies™, affimers, nanoclamps), generally via flexible linkers, to or near the nanopore, and use of multiple copies of the tag on the detection antibody.

Figure 2:
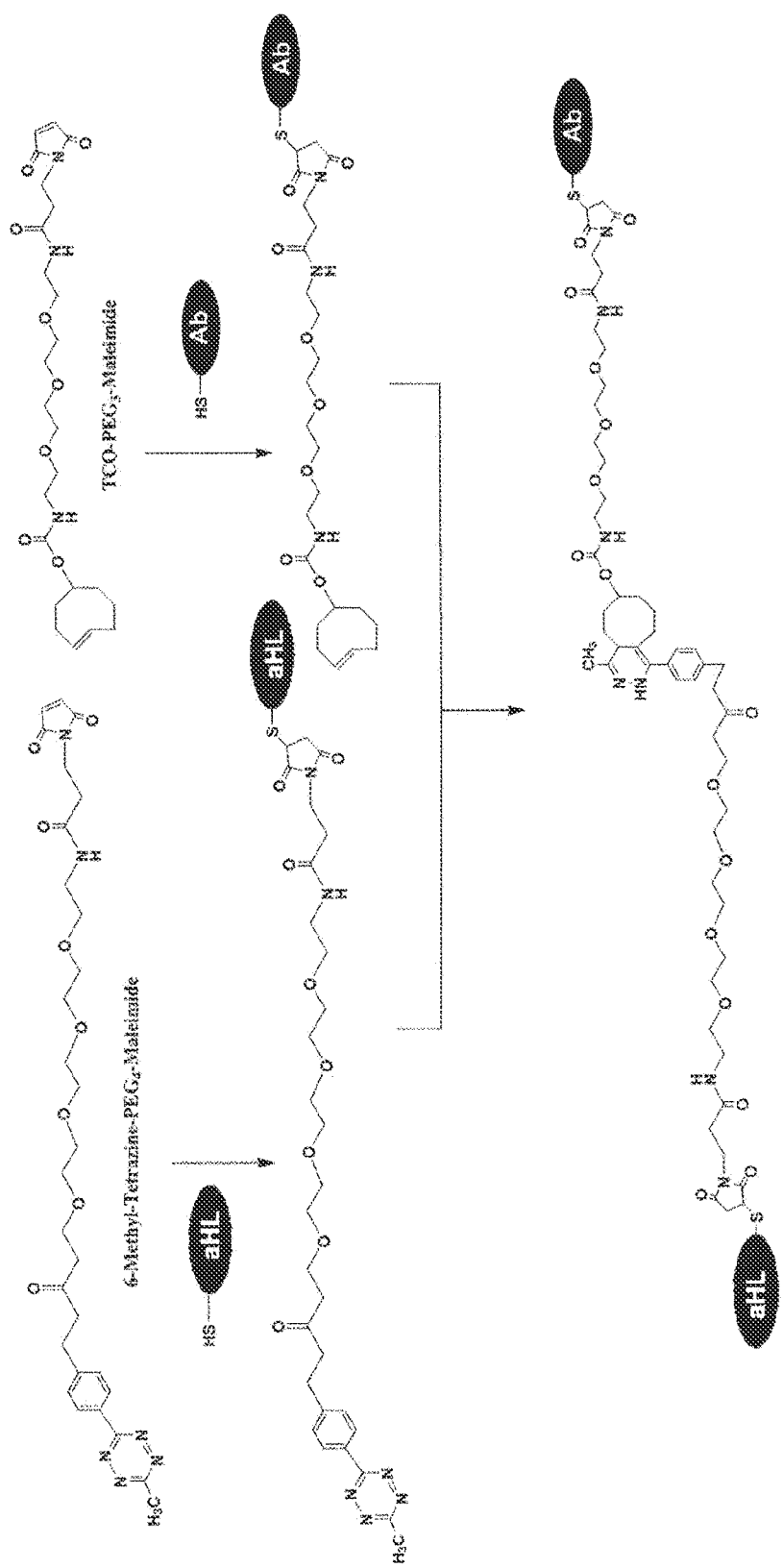
FIG. 2: Diels Alder Conjugation of α-Hemolysin Nanopore (αHL) and Capture Antibody (Ab) Via Sulfhydryl Groups on Both Proteins. Following the approach described in U.S. Pat. No. 9,890,426 B2 for conjugation of αHL to DNA polymerases, the αHL protein can also be attached to an antibody molecule. In this case cysteines in both proteins are used. In the case of αHL, the protein is engineered to have a single cysteine at a desired position. In the case of the antibody molecule, prior treatment with a reducing agent to cleave disulfide bonds between cysteines exposes an SH group. The two linkers each have a maleimide at one end for attachment to the SH group in the respective proteins. The opposite end of the first linker has a tetrazine moiety and the opposite end of the second linker has a trans-cyclooctene (TCO) moiety. The tetrazine and TCO react via a rapid Diels-Alder reaction to conjugate the AHL to the Ab. In an optional approach, the maleimide on either linker may be replaced with a succinimide ester for attachment to the amino groups at the N-termini or in lysines of the respective proteins. The maleimide group can also be replaced by an amino group for attachment to carboxy groups (e.g., after oxidation of carbohydrates on antibody molecules) or by biotin for conjugation via a biotin-streptavidin interaction. The Chromalink® (TriLink® Biotechnologies) conjugation strategy is similar except that the conjugation occurs between an aromatic hydrazine and an aromatic aldehyde (protocol available from TriLink® Biotechnologies).
Figure 3:
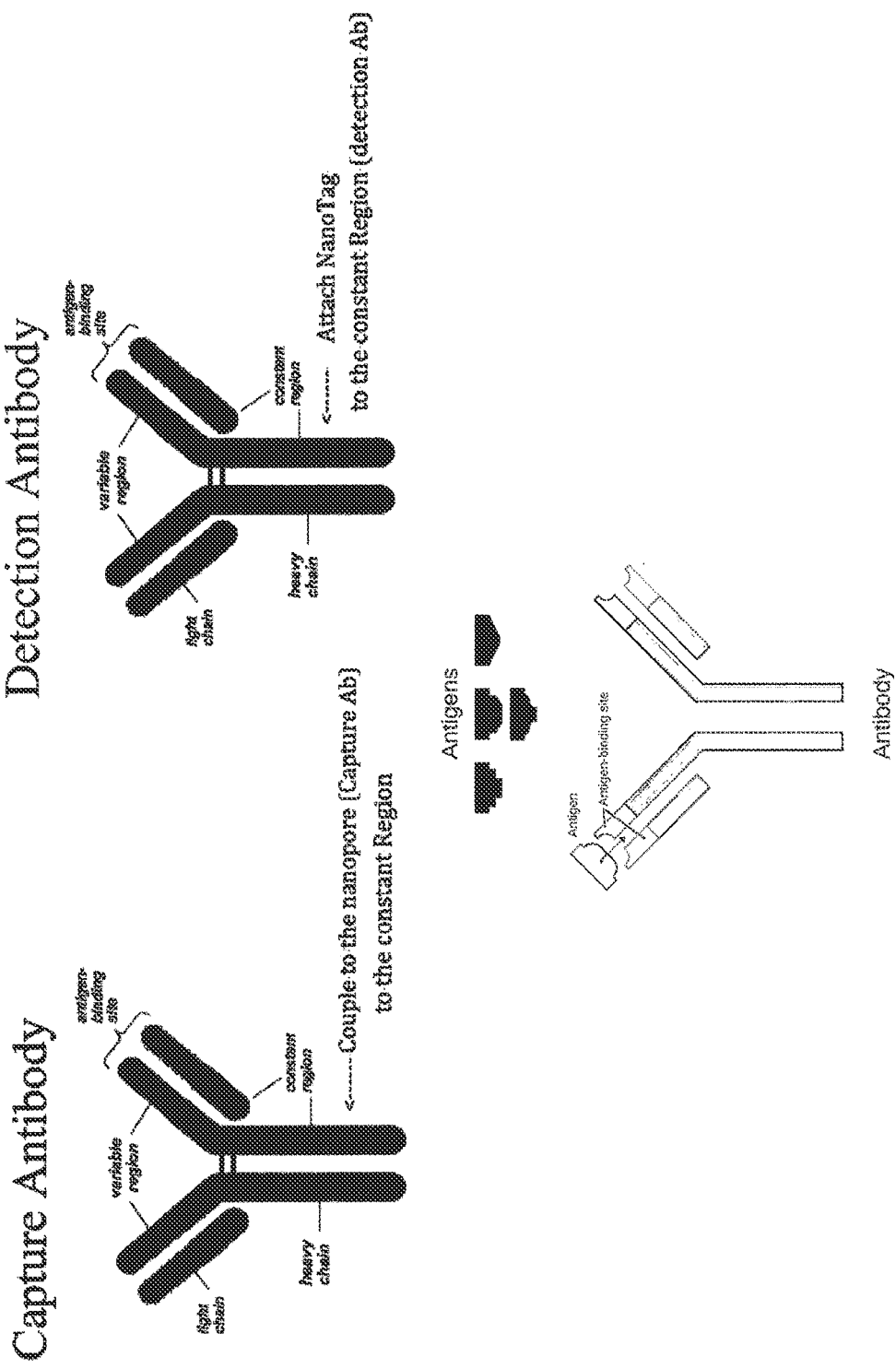
FIG. 3: Structure of Capture and Detection Antibodies with Available Binding Sites. A difference between the capture antibody and the detection antibody is in the antigen binding site. For a given target molecule, the capture antibody and detection antibody will be selected to bind to different epitopes. Alternatively, the capture and detection antibodies may be the same but bind to multiple epitopes on the target molecule such that each will bind in random fashion to a different subset of the epitopes on the target molecule. In a basic protocol, the capture antibody will be conjugated to the nanopore and the detection antibody will be attached to a target-specific NanoTag. In an embodiment only one capture antibody will be bound to each nanopore, and only one tag will be bound to each detection antibody. The usual attachment sites include the amino group at the N-termini of the four subunits and the primary amines on lysine residues throughout the antibody, but this is a random process and can lead to multiple attachments. Following reduction of the disulfide bonds (shown as parallel lines connecting the heavy chains in the hinge region), the resulting SH bonds provide less random positions for conjugation. There are also carbohydrate groups in the constant region of the heavy chains which can also provide directed sites for conjugation.

Example 1: Attaching the capture antibody to the nanopore. The attachment of the capture antibody ($1^{st}$ antibody or antibody 1) to the nanopore is identical in the original and new methods. A person skilled in the art will know several methods to derivatized the antibody, taking advantage of key amino acid residues such as lysines or cysteines. These linkages can involve homo- or heterobifunctional reagents, or two-linker systems such as that available from TriLink® Biotechnologies (Chromalink™ reagents) or those involving a Diels-Alder reaction (see below). Other possibilities include the generation of fusion proteins incorporating Spy-Catcher/SpyTag interaction partners (Zakeri et al. 2012). In one embodiment the Fc portion of the immunoglobulin (Ig) is bound to the nanopore, leaving the $Fab'_2$ portion free to react with the antigen. The presence of NHS esters or isothyiocyanate groups on the end of a linker molecule will allow its attachment to the N terminal amino group or primary amino groups on lysines of the antibody. Though lysines are present in both the Fc and Fab portions, this straightforward method generates a large percentage of acceptable attachments. A second possibility is attachment to cysteine residues in the hinge region of the Ig molecule. The presence of maleimide or iodoacetamide on a linker would allow its attachment to the SH group on cysteines, which would require reduction of the disulfide bonds connecting two cysteines. This will affect the binding of the two large subunits of the Ig to each other. While this may somewhat reduce the overall avidity of binding, it is one of the simplest and more site directed alternatives. Another attractive possibility is to conjugate amine- or hydrazide-modified linkers to the periodate-oxidized carbohydrate groups occurring on the Fc constant domains, following by reduction of the resulting Schiff bases with borohydrides. Other possibilities for conjugation include click chemistry (e.g., alkyne-azide) reactions and biotin-streptavidin interactions. A Diels-Alder heterobifunctional conjugation strategy for attaching DNA polymerase to α-hemolysin (αHL) nanopores has been previously reported (U.S. 2016/0041179 A1), and the attachment of antibodies to these nanopores would follow the same approach (FIG. 2). Implementing the conjugation strategies described above takes advantage of alpha-hemolysin mutant proteins we have already generated, in which single cysteines have been introduced at specific positions on one or more of the seven pore subunits, rendering them specifically reactive with maleimide and other sulfhydryl-reactive moieties. Finally, directed attachment strategies based on incorporating orthogonal amino acid analogs into the protein can be performed. Regardless of the specific method used, the goal is to attach a single or just a few copies of a specific antibody to each nanopore in a nanopore array. (See FIG. 3 top left for capture antibody structures and conjugation sites.) An alternative strategy is herein disclosed in which beads containing clusters of identical capture antibodies are used to increase the likelihood of target capture (e.g., FIG. 9).

A variety of protein and solid-state nanopores can be used. While we have used the α-hemolysin nanopore including a wide variety of mutant forms in sequencing by synthesis studies (U.S. 2018/0073071 A1, U.S. Pat. No. 9,890,426 B2, U.S. 2.015/0368710 A1, U.S. 2015/0111759 A1, U.S. Pat. No. 8,889,348 B2, U.S. 2013/0264207 A1, Kumar (2012), Fuller (2016), and Stranges (2016)), other protein nanopores such as MspA Derrington et al 2010), OmpG (Sanganna Gari et al 2019), FraC (Huang et al 2019), aerolysin (Wang at al 2018), anthrax protective antigen (Jiang et al 2015), other beta-barrel transmembrane pores (Heuck et al 2001) and various commercial bespoke nanopores, their mutants and derivatives can be used.

For these, most of the attachment and conjugation chemistries described above can be utilized. Other options include solid-state nanopores based on graphene (Merchant and Drndic 2012), $MoS_2$(Graf et al 2019), $Si_3N_4$ (Rollings et al 2012) and other materials (Shi et al 2017), hybrid protein-solid state nanopores (Hall et al 2010), and nanopores with integrated electronic sensors (Rosenstein et al 2012). In these cases, a wide variety of derivatization and coupling strategies, many identical to those above, and all well known in the art, can be used. In some embodiments, the $1^{st}$ antibody can be attached not directly to the nanopore but in the close vicinity (see Example 10 below). Multiple copies of the antibody can be attached to or near the nanopore.

Finally, the $1^{st}$ antibody or the nanopore associated with it can be specifically tagged with a nanopore-detectable tag, so that their identity can be later recognized on the nanopore array in complex multiplexing formats even in the absence of the bound biomarkers. Among many methodological benefits, this implementation provides for directly measuring the absence of a specific biomarker in the complex analyte mixtures. Binding can be assessed by use of gel shift assays. This approach is described in more detail in Example 11 below, where it is described for multiplex detection of target molecules.

Figure 4A:
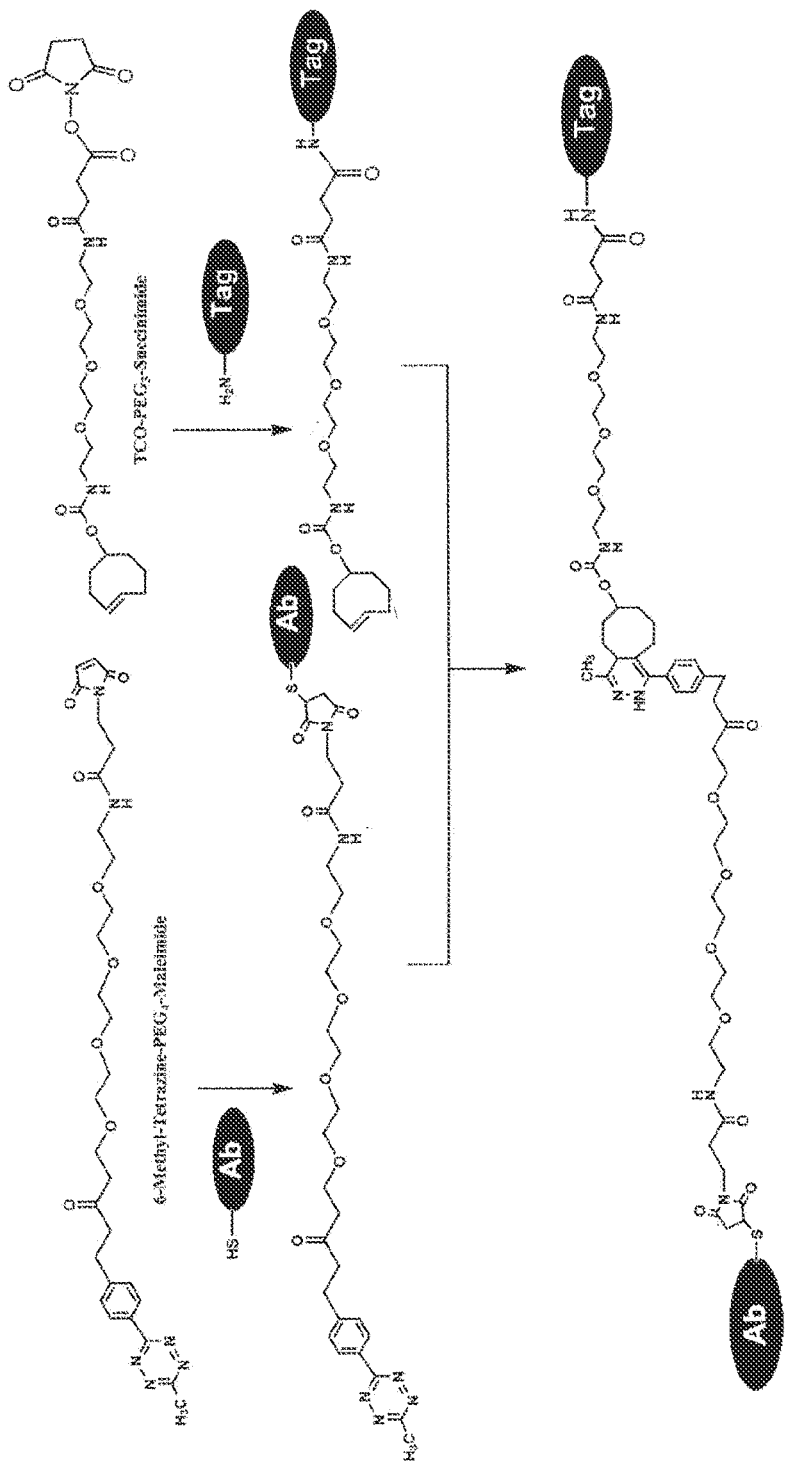
FIG. 4A: Diels Alder Conjugation of Antibody (Ab) and Nanopore Detectable Tag Via Sulfhydryl Groups on Ab and Amino Group on Tag. In this procedure, an antibody (the $2^{nd}$ or detection antibody in this embodiment), is attached via a cysteine SH group to a maleimide containing linker as described in FIG. 2. The nanopore-detectable tag is attached via a terminal amino group to a second linker ending in a succinimide ester. The opposite ends of the first and second linkers have a tetrazine moiety and a trans-cyclooctene (TCO) moiety, respectively. The tetrazine and TCO react via a rapid Diels-Alder reaction to conjugate the tag to the Ab. In an optional approach, the maleimide on the first linker may be replaced with a succinimide ester for attachment to the amino groups at the N-termini or in lysines of the antibody molecule. The maleimide group can also be replaced by an amino group for attachment to carboxy groups (e.g., after oxidation of carbohydrates on antibody molecules) or by biotin for conjugation via a biotin-streptavidin interaction. The Chromalink® (TriLink® Biotechnologies) conjugation strategy is similar except that the conjugation occurs between an aromatic hydrazine and an aromatic aldehyde.
Figure 4B:
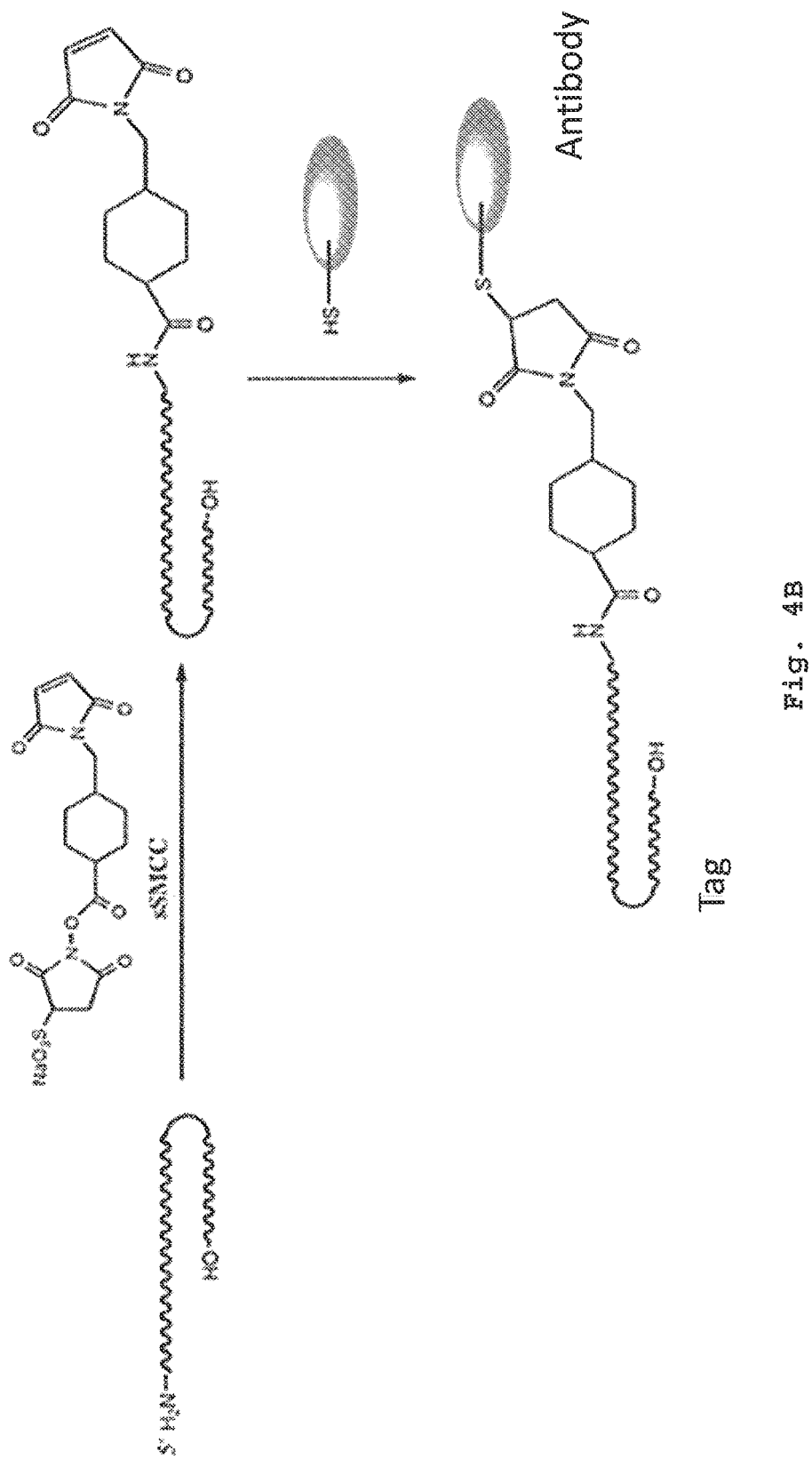
FIG. 4B: Use of a Sulfo-SCC Sulfosuccinimidyl 4-(N-Maleimidomethyl)Cyclohexane-1-Carboxylate) to Conjugate an Amino-Terminated Tag to Cysteine Group on an Antibody. The sulfosuccinimidyl ester on one end of the sSMCC linker reacts with the 5' amino group on an oligonucleotide tag. The maleimide on the opposite side of the linker can then react with —SH groups on cysteine residues in the detection ($2^{nd}$) antibody, shown as a gray oval in this cartoon.

Example 2: Attaching the tag to the second antibody (detection antibody). The second antibody will be attached to a nanopore-detectable tag. Poly(ethylene)glycol (PEG)-based tags (U.S. 2015/0111759 A1 and Kumar (2012)), with a voltage gradient across the membrane from positive (cis side) to negative (trans side) have been reported. More recently, tags with negatively charged polynucleotide backbones requiring a reverse voltage polarity (negative on cis side and positive on trans side) have been reported (U.S. 2013/0264207 A1, Fuller (2016), and Stranges (2015)). The oligonucleotides will be modified with a terminal amine for attachment to NHS ester-containing linkers (see FIGS. 4A and 4B for two different methods for attachment of such a linker to the detection antibody), though a variety of other modifications of the tag for linker attachment are also well known. The attachment positions on the second antibody will be identical to those described in the previous paragraph for attaching linkers to the first antibody. Notwithstanding the specific method used, the goal will be to attach a single tag (or a few copies of the tag to increase likelihood of signal detection) to each detection antibody. (See FIG. 3 top right for detection antibody structures and conjugation sites.)

Again, as mentioned above in Example 1, the $1^{st}$ antibody or the nanopore associated with it can be specifically tagged with a nanopore-detectable tag, so that their identity can be later recognized on the nanopore array in complex multiplexing formats even in the absence of the bound biomarkers. Among many methodological benefits, this implementation provides for measuring directly the absence of a specific biomarker in the complex analyte mixtures. Binding of the tag to the $2^{nd}$ antibody can be assessed by gel shift assays and/or with the use of fluorescent labels included in the tag, preferably at the opposite end from the amino modification.

Example 3: Alternatives to antibodies. While antibodies are the most commonly used and probably best-understood molecules for binding to a wide range of targets (antigens), recently a variety of antibody mimetics including affibodies (Lofblom et al 2010), Avibodies™ (avipep Pty Ltd), affimers (Tiede et al 2017), nanoclamps (Suderman et al 2017) and a variety of other small organic molecules have been produced, many of which have been developed as pharmaceutical agents. In addition, fusion proteins consisting of antibody fragments can be used in place of whole antibodies.

Example 4: Types of target antigens (analytes). While the most typical antigens will be protein molecules, and many proteins have indeed been identified as biomarkers, antigens can include a variety of other small molecules or macromolecules, including lipids, carbohydrates, DNA, or composite molecules such as glycoproteins or lipoproteins, or larger complexes such as viral particles, again largely focusing on biomarkers for cancers and other diseases, including but not limited to infectious processes. In addition to pathology, other physiological and pre-disease states can be identified and monitored with appropriate biomarkers, including pregnancy, aging, drug responses, etc. Samples of particular interest will be blood, urine and other fluids for non-invasive diagnostics, but will also include tissue biopsies or appropriately preserved archival autopsy material.

Example 5: Protein-protein and other molecular interactions. In addition to antigen-antibody (or antibody mimetic) interactions, the method can also be used to identify other molecular interactions. Key molecular interactions in biology include those between proteins, protein-DNA and protein-RNA interactions, binding of small molecules and cofactors to macromolecules such as drug-enzyme and drug-receptor interactions, and many others (Vidal et al 2011). Classic biochemical and genetic methods for recognizing these interactions have many shortcomings. For instance, for protein-protein interactions, gel shift assays can examine the protein interactions for a given bait protein. The method is limited to one bait protein at a time. Similarly, the yeast two-hybrid and related methods can identify the targets of a particular protein used as bait. While in principle protein chips using multiple bait proteins can be designed, maintaining these surface-bound proteins in a form that can recognize their natural partner proteins is difficult, and unlike with antibody-based protein chips, for which many Ab's already exist, these would have to be developed specifically for each bait protein. Here the bait protein (or other interacting molecule) would be attached to the nanopore via a flexible linker in such a way that it preserves its structure and binding properties.

Figure 5:
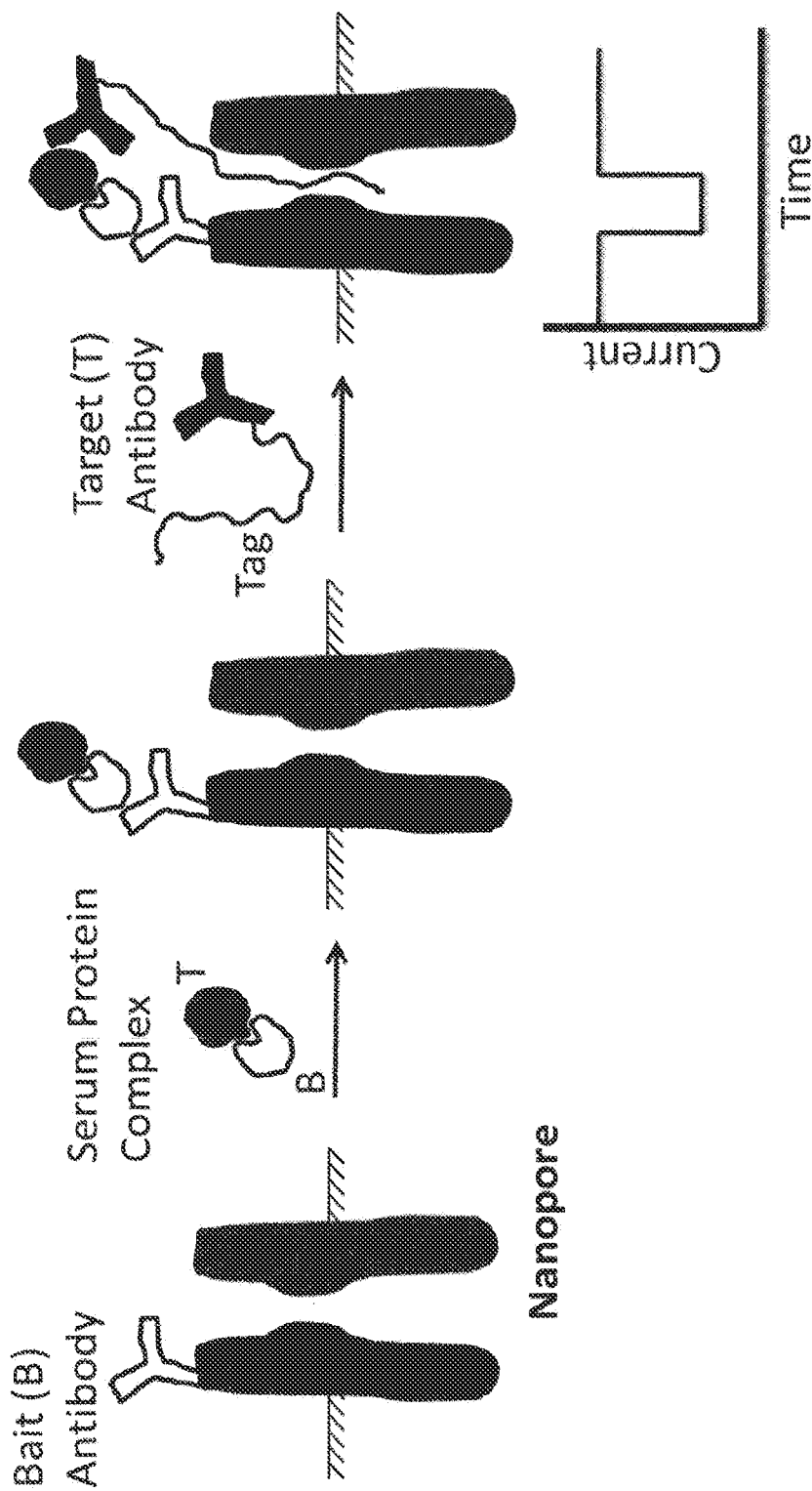
FIG. 5: Using Nanopore Sensing to Detect Protein-Protein Interactions. In this embodiment, nanopores are conjugated to antibodies directed against a bait protein and inserted into membranes over a nanopore sensor. Next, the sample containing putative interacting proteins is flowed over the chip and the bait protein with its interaction partners is captured by the bait antibody. If desired, a cross-linking step may be included to maintain interactions between bait and target proteins. Next, antibodies to putative target proteins, each bearing a different distinguishable nanopore-detectable tag, are flowed over the chip in an electrolyte solution. After a voltage is applied across the membrane, the tags enter the channel of the nanopore and the ionic current is measured. A current blockade signature indicative of a given tag will reveal binding between the bait and that particular target protein. With a large enough array, it will be possible to determine how often different target molecules are associated with the bait protein. In addition to protein-protein interactions, this approach can be used to detect protein-DNA, protein-RNA, and many other molecular interactions, so long as an antibody, antibody mimetic, or other recognition molecule is available for both the bait and the target. Though shown here with a single bait protein, multiple copies of the bait protein may be attached to the nanopore.

Thus, herein is disclosed an approach for identifying protein-protein interactions, in which the capture antibody (antibody 1) is specific for the bait protein, and the tagged detection antibody (antibody 2) is specific for the bait's potential target proteins. In this protocol, as illustrated in FIG. 5, the following series of steps are performed: (1) antibody 1 is conjugated to or near the nanopore, which is already or subsequently inserted into the membrane; (2) the sample containing putative interacting proteins is added to the chip to bind the bait protein and any associated proteins (a cross-linking step may be performed to maintain these protein-protein interactions either before or after adding to the chip); (3) tagged antibody 2 (attached via a cleavable linker if antibody 1 was not attached directly to the pore (e.g. to the surface or membrane); attached via a non-cleavable linker if antibody 1 was attached directly to nanopore) specific for a putative target protein is added to the chip in an electrolyte solution; (4) cleavage of the tag is performed if required; and (5) a voltage is applied across the membrane and ion current recorded; identification of the expected signal (ionic current blockade) for the tag is indicative of binding of the target to the bait.

As mentioned above, the concept can be further expanded to a format where the reaction steps (1-3) related to binding the bait and target with the nanopore complex and the appropriate antibodies are performed in solution phase, and then the enriched nanopore-antibody-bait-target-tagged antibody complexes are applied to a nanopore array and assessed at the single-molecule level. Formation of the complexes can be assessed by gel shift assays or with the use of fluorescent labels, prior to applying to the array.

Though single capture antibody molecules are shown in FIG. 5, one can bind multiple capture antibodies or small antibody mimetics to the nanopore to increase the chance of capture, and thus sensitivity.

Figure 6:
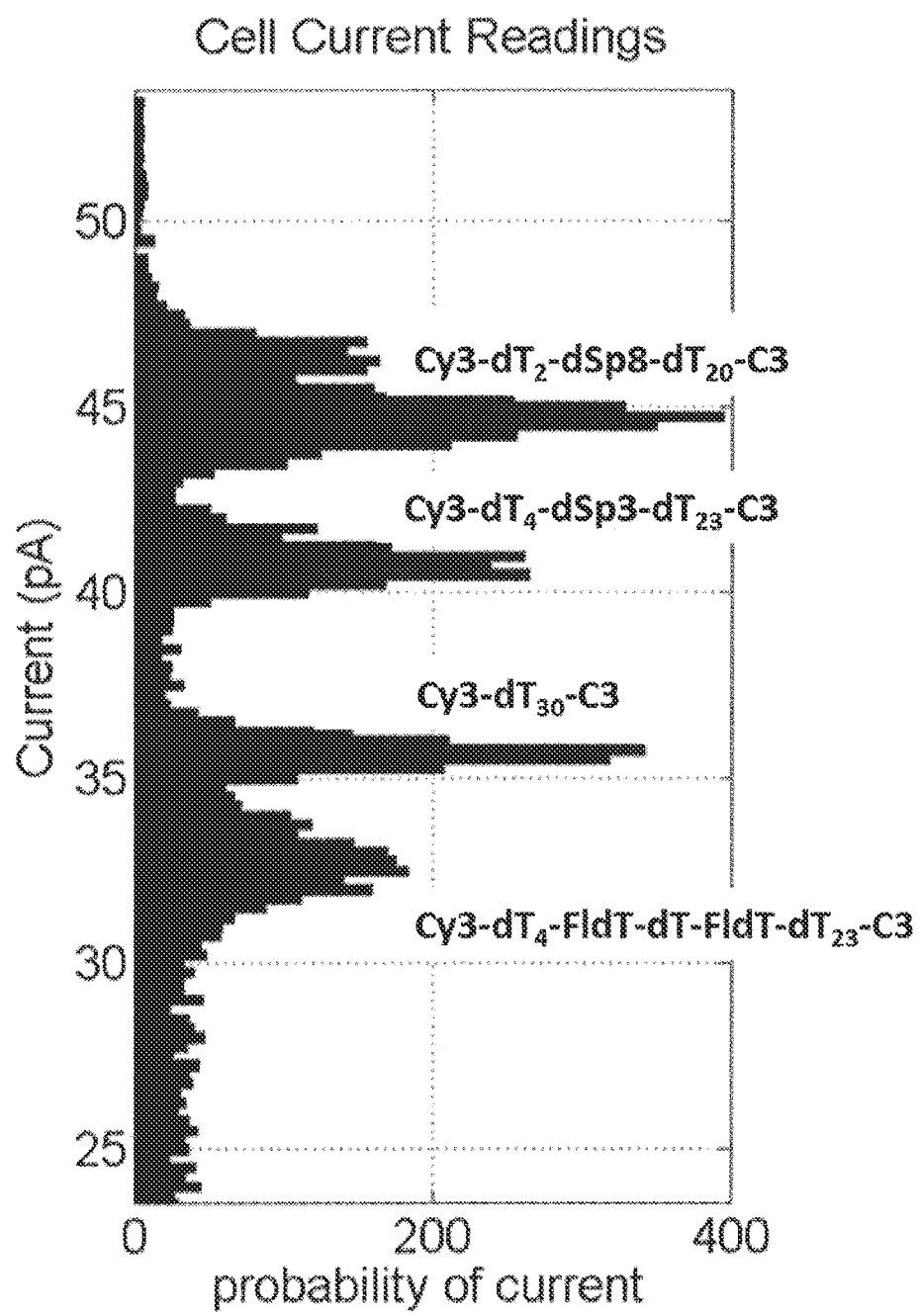
FIG. 6: Nanopore Current Readings with Different Unique Tags. Tags were synthesized with 30 nucleotide long oligonucleotide backbones (T), with modifications at some positions to either reduce (dSp) or enlarge (fluorescein-dT (FldT)) the cross-section of the backbone at those sites. Those with a higher proportion of narrow stretches had the highest current (least ionic current blockade relative to open channel current) while those with the widest cross-section had the lowest current (largest ionic current blockade) (Fuller et al 2016).
Figure 7:
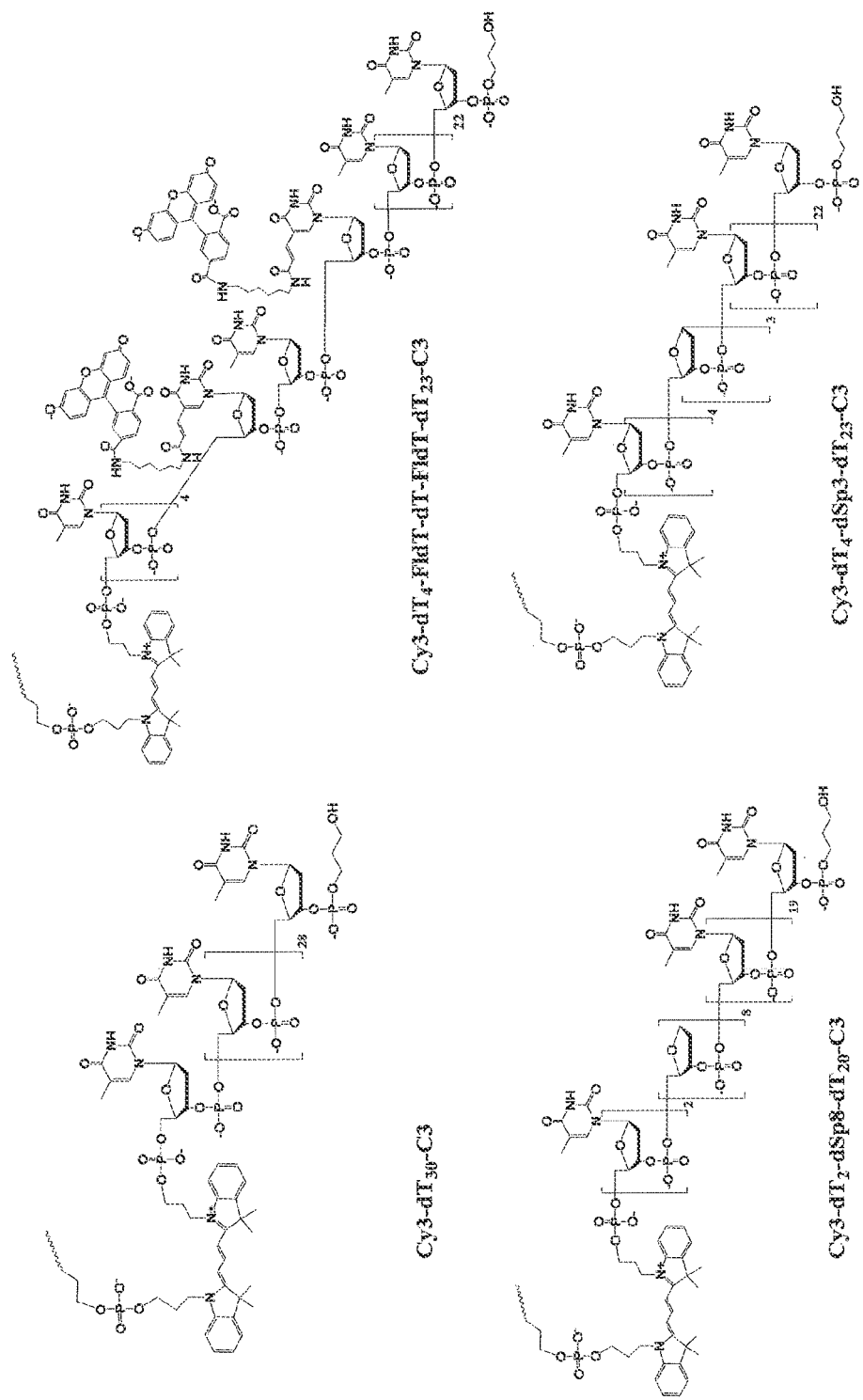
FIG. 7: Examples of Tags Used for Nanopore Detection. These tags contain 30 deoxythymidine (T) nucleotides (top left), 28 T's interrupted by two fluoresceinated T's (FldT, top right), 22 T's interrupted by 8 (lower left) or 3 (lower right) abasic (dSp) residues. The largest ionic current blockades in nanopores would be obtained with the tag with the FldT sites, followed by the T30, followed by the dSp3, and the lowest current blockade would be obtained with the dSp8-containing tag (Fuller et al 2016).
Figure 8:
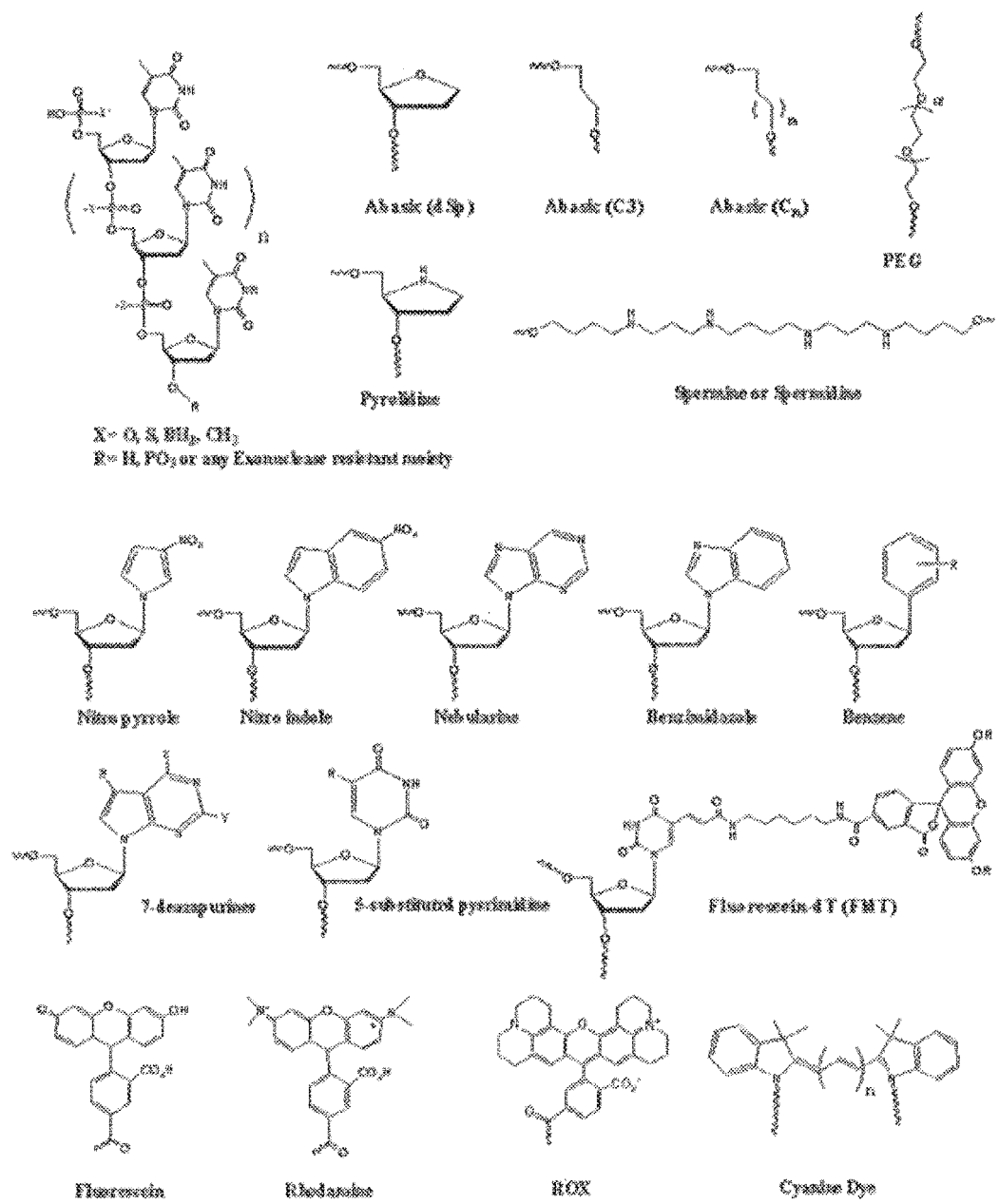
FIG. 8: Examples of Tags for Nanopore Sensing. Tags can have a variety of backbones, e.g., oligonucleotide, PEG, spermine, alkane, abasic sites (examples shown in the top 2 rows), alternative bases and similar sized substituents (examples shown in $3^{rd}$ and $4^{th}$ rows), and different dyes or other bulky substitutents attached to the base (fluorescein-dT in 4$^{th}$ row; other example fluorescent dyes shown in last row).

Example 6: Nature of the tags. The tags are typically polymeric molecules that penetrate the channel of the nanopore to reduce the ionic current to a defined extent when a given voltage is applied across the membrane into which the nanopore is inserted. A wide variety of polymers have been developed for this purpose (U.S. 2018/0073071 A1, U.S. 2015/0368710 A1, U.S. 2017/0058335 A1, and WO 2016/154215 A1). Examples comprise polymers containing PEG, alkane, peptide/polypeptide, and polynucleotide backbones, or a combination of these. These polymers may, in turn, be modified in a variety of ways to expand or reduce their diameters in key positions of the channel, to have more negative or more positive overall or focal charge, to be more or less polar, or to have affinitive properties for the nanopore. Many examples of such tags have been presented (U.S. 2018/0073071 A1, U.S. 2015/0368710 A1, and NO 2016/154215 A1). FIG. 6 shows the separation of ionic current readings that can be obtained with different tags entering the pore. FIGS. 7 and 8 show examples of tags, many of which have been synthesized and reported elsewhere (Kumar (2012), Fuller (2016), and Stranges (2016)).

Example 7: Basic Protocol for Nanopore Based Protein Sensing Using Antibodies 1 and 2, Each to a Different Portion of the Protein. In the exemplary approach, presented in FIG. 1: (1) the antibody 1 (capture antibody)-labeled nanopore will be inserted into membranes on the chip, ideally one nanopore per sensor on the array; (2) Next, the chip will be incubated with antigens present in a sample; (3) Then, typically, the chip will be incubated with tagged antibody 2 (detection antibody) in an electrolyte solution; (4) Finally, a voltage will be applied across the membranes and the resulting ionic current measured: sustained current blockade indicative of tag entry into the nanopore channel will indicate binding of antigen to the complex. Washes are carried out between incubations, as necessary to remove unbound molecules from the previous incubations, which may inhibit or compete with subsequent steps. The electrolyte solutions can be adjusted over a wide range with regard to particular ions and their concentration depending on the desired conditions for distinguishing ionic current levels. While single nanopore setups (e.g., Axopatch, EBS) can be used to perform test experiments, nanopore arrays have been developed (Fuller et al 2016) and are desirable for further optimization of the system and essential for multiplexing and digital quantitation.

The same antibody may be used as both the capture and detection antibody, so long as they can bind to different positions on the antigen (e.g., polyclonal antibodies that recognize multiple epitopes on the antigen).

This basic approach can be performed in a format where the reaction steps related to binding the biomarkers with the nanopore-conjugated antibody 1 and tagged antibody 2 are performed in solution phase, e.g. in an appropriate microfluidic device, and then the enriched nanopore-antibody-biomarker-tagged antibody complexes are applied to a nanopore array and assessed at the single-molecule level.

In some applications it may be advantageous to perform the microfluidic reactions of nanopore antibody-antigen binding and washing steps on magnetic beads (for example, as described in Ng et al. (2018)) but then cleave off the nanopore complexes from the beads and detect them on the chip. The enriched nanopore-antibody-biomarker-tagged antibody complexes are applied to a nanopore array and assessed at the single-molecule level as described in the previous examples. In this case the nanopore complex will be tethered to the paramagnetic particles via a cleavable linker, such as those presented in FIG. 17.

In the approach illustrated in FIG. 1, a single capture antibody (antibody 1) is shown attached to the nanopore. If desired, multiple capture antibodies, or small antibody mimetics (e.g., affibodies, avibodies, affimers, etc.) can be attached to the nanopore, increasing the likelihood of target capture, which will be advantageous if the target is present in low abundance, and higher sensitivity is required.

In an exemplary embodiment of Example 7, the capture antibody and detection antibody can be directed against breast cancer biomarkers comprising MUC-1, carcinoembryonic antigen, CA-125 and estrogen receptors such as HER2 (Gam 2012; Mueller et al 2018).

An alternative approach (FIG. 9) that can be used to further enhance sensitivity of the method would be the use of capture antibody-studded nanometer-scale magnetic beads attached to the nanopore via biotin-streptavidin, digoxigenin-anti digoxigenin, or any of the alternative conjugation methods described earlier. In this case, the beads would be used to capture antigenic biomarker targets from the serum or other sample. The beads would also possess chemical substitutions on the surface for binding to or near nanopores (a wide variety of chemical interaction partners, including but not limited to those mentioned above, are available for conjugation). The nanopore-bound complex would be inserted into lipid membranes on a nanopore array chip, one nanopore per sensor (electrode) position. Next the chip would be incubated with tagged detection antibodies, specific for the biomarker of interest. This would result in identification of the bound biomarker following application of a voltage across the membranes with capture of the nanopore distinguishable tag in the channel of the nanopore and the resulting tag-specific ionic current blockade. The advantage of the use of magnetic beads would be the enhanced sensitivity, since there is both an increased chance of binding the biomarker due to the presence of many capture antibodies on the bead, and an increased chance of binding the detection antibody increasing the likelihood of tag capture by the nanopore.

Attachment of Capture Antibody to Bead and Bead to Nanopore. In a preferred embodiment, amino group derivatized magnetic beads will be incubated with both maleimide NHS ester and biotin NHS ester at an appropriate ratio such that the beads will be derivatized with both maleimide and biotin at a 10:1 or higher ratio. A subsequent conjugation reaction with antibody will yield capture antibody-bound beads vis a thiol-ene reaction, with a small amount of biotin co-existing on the bead. The biotin will be used as a binding compound (binding compound 1) to attach the capture antibody decorated beads to a streptavidin (binding compound 2)-bearing nanopore through a biotin streptavidin interaction. The resulting nanopore with capture antibody-studded bead is then inserted into the lipid membrane and the procedure described in the previous paragraph is followed to detect the compound of interest at high sensitivity.

Figure 10A:
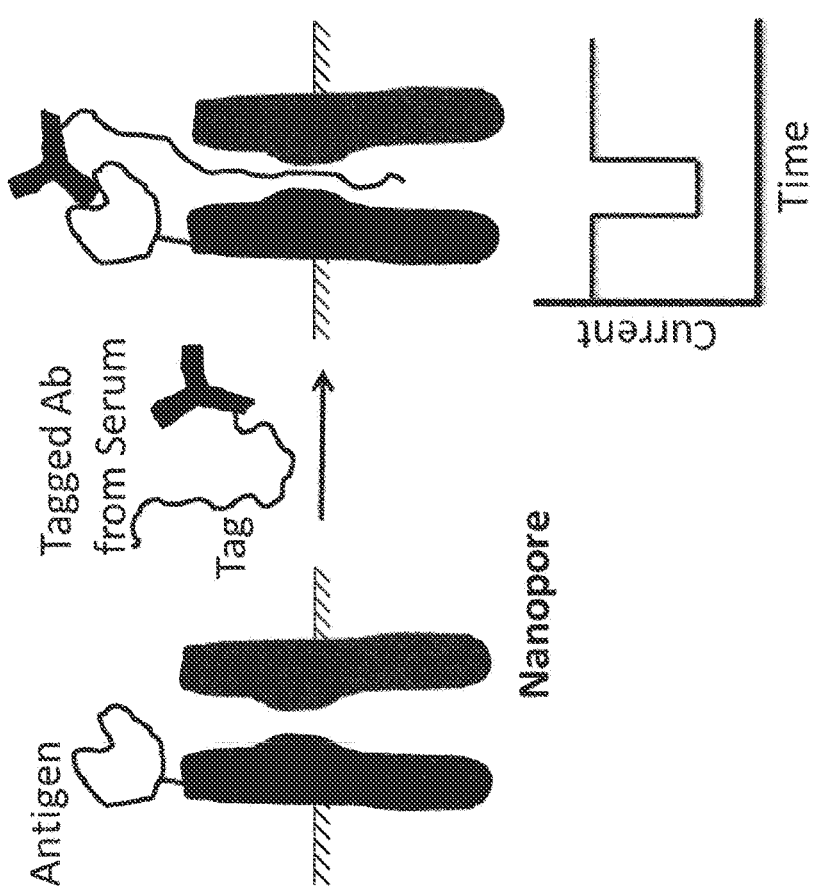
FIG. 10A: Nanopore detection of tagged serum antibodies using capture antigen. In this embodiment, proteins such as antibodies in the serum are conjugated to nanopore-detectable tags using standard labeling procedures. An antigen attached to the nanopore is used to capture the tagged antibodies from the serum sample. A voltage gradient is applied across the membrane to capture the tag and the current is recorded. Recognition of its specific tag signal will reveal the presence of the antibody of interest in the serum sample. While shown here as a single antigen, multiple antigen copies may be attached to the nanopore.
Figure 10B:
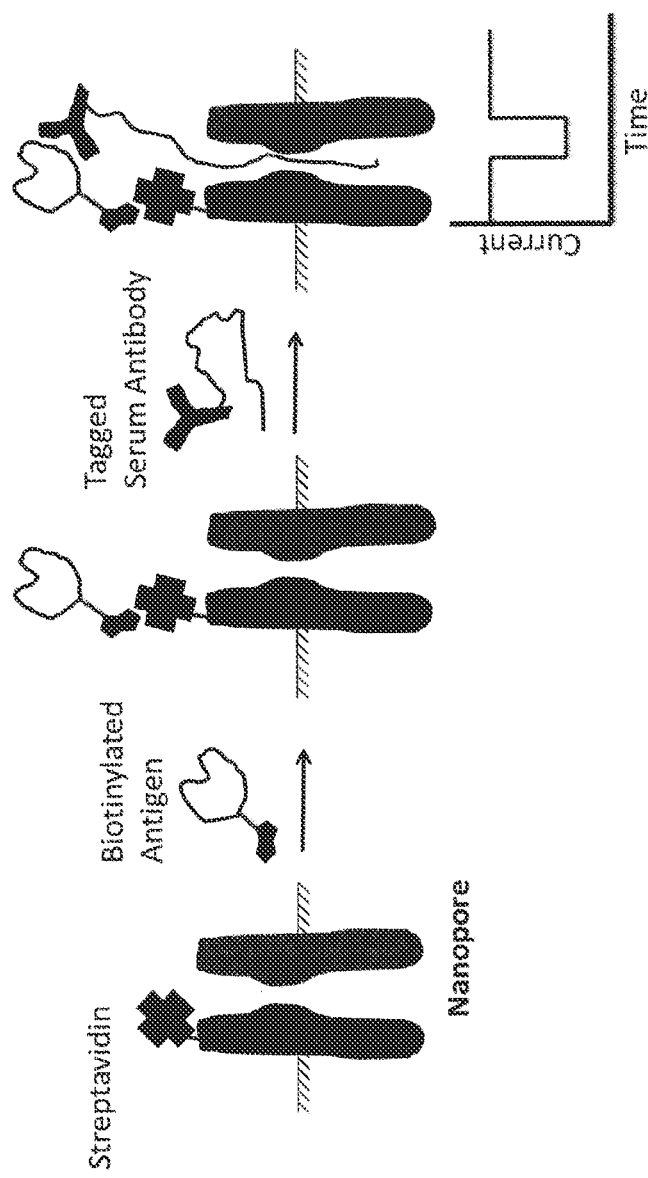
FIG. 10B: Nanopore detection of serum antibodies using streptavidin capture. In this embodiment, serum antibodies are conjugated to nanopore-detectable tags using standard procedures and antigens for these serum antibodies are biotinylated. A streptavidin molecule attached to the nanopore is used to capture the biotinylated antigens via a biotin-streptavidin interaction. Next, the tagged serum antibodies are bound to the complex on the nanopore. A voltage gradient is applied across the membrane to capture the tag in the nanopore channel and the current is recorded. Recognition of its specific tag signal will reveal the presence of the antibody of interest. The placement of the biotin and streptavidin may be reversed.
Figure 10C:
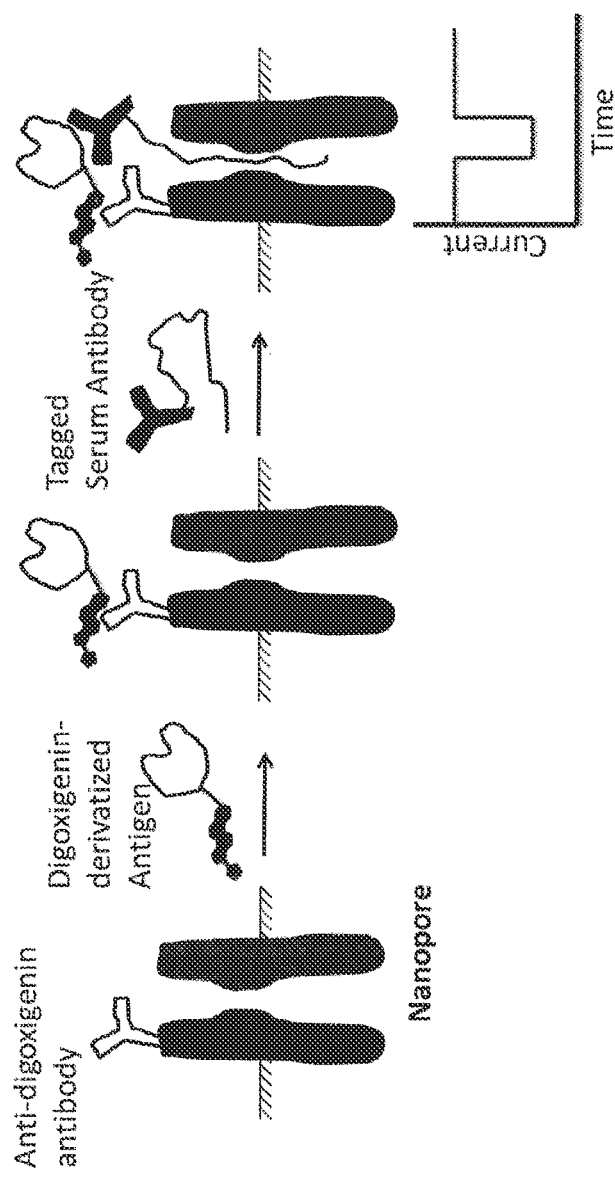
FIG. 10C: Nanopore detection of serum antibodies using anti-digoxigenin antibody capture. In this embodiment, serum antibodies are conjugated to nanopore-detectable tags using standard procedures and antigens for these serum antibodies are derivatized with digoxigenin. An anti-digoxigenin antibody molecule attached to the nanopore is used to capture the digoxigenin-labeled antigens via a digoxigenin-anti digoxigenin interaction. Next, the tagged serum antibodies are bound to the complex on the nanopore. A voltage gradient is applied across the membrane to capture the tag in the nanopore channel and the current is recorded. Recognition of its specific tag signal will reveal the presence of the antibody of interest. The placement of the biotin and streptavidin may be reversed.
Figure 11A:
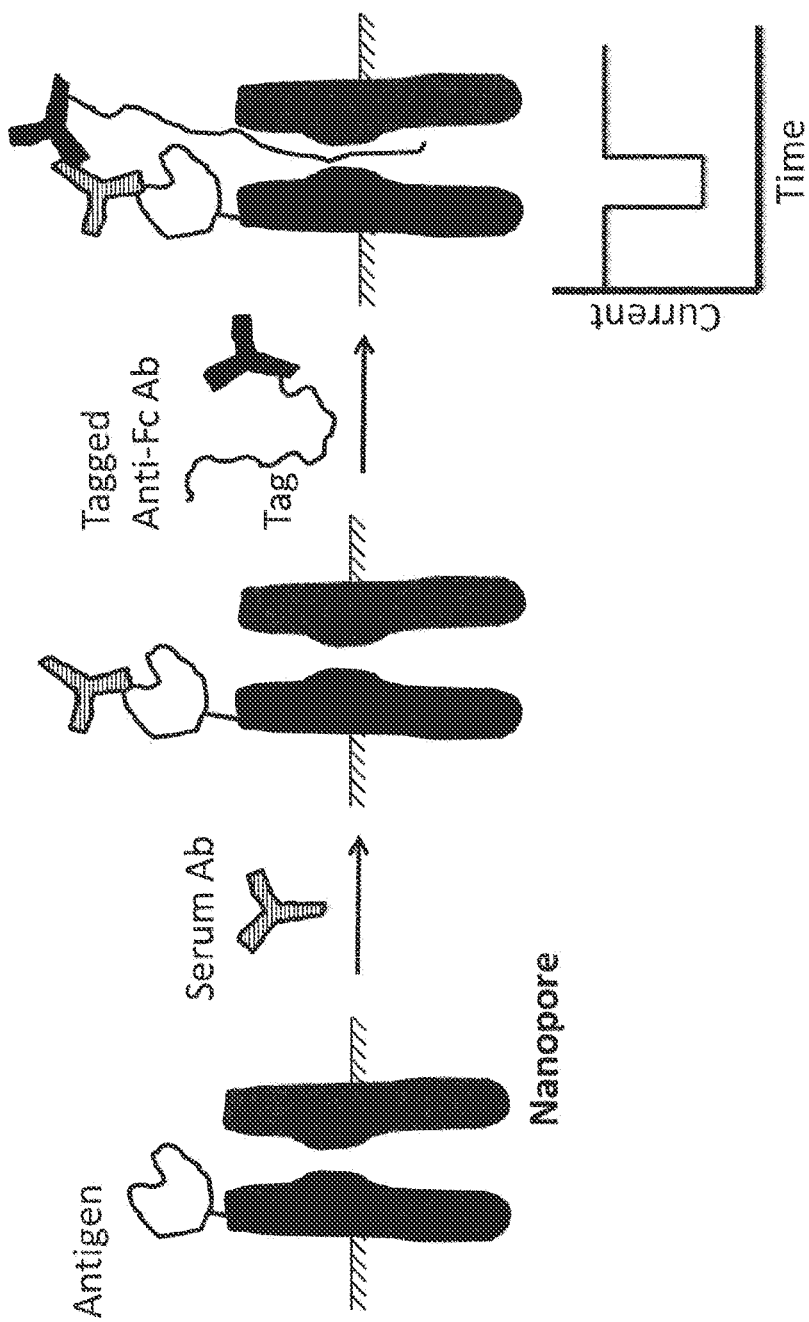
FIG. 11A: Nanopore detection of serum antibodies using capture antigen and tagged secondary antibody. In this embodiment, an antigen is bound to the nanopore and used to capture specific serum antibodies. Next a tagged secondary antibody (one raised to the Fc portion of the captured antibody) is flowed over the nanopore chip. A voltage gradient is applied across the membrane to capture the tag and the current is recorded. Recognition of its specific tag signal will reveal the presence of the antibody of interest in the serum sample. While shown here as a single antigen, multiple antigen copies may be attached to the nanopore.
Figure 11B:
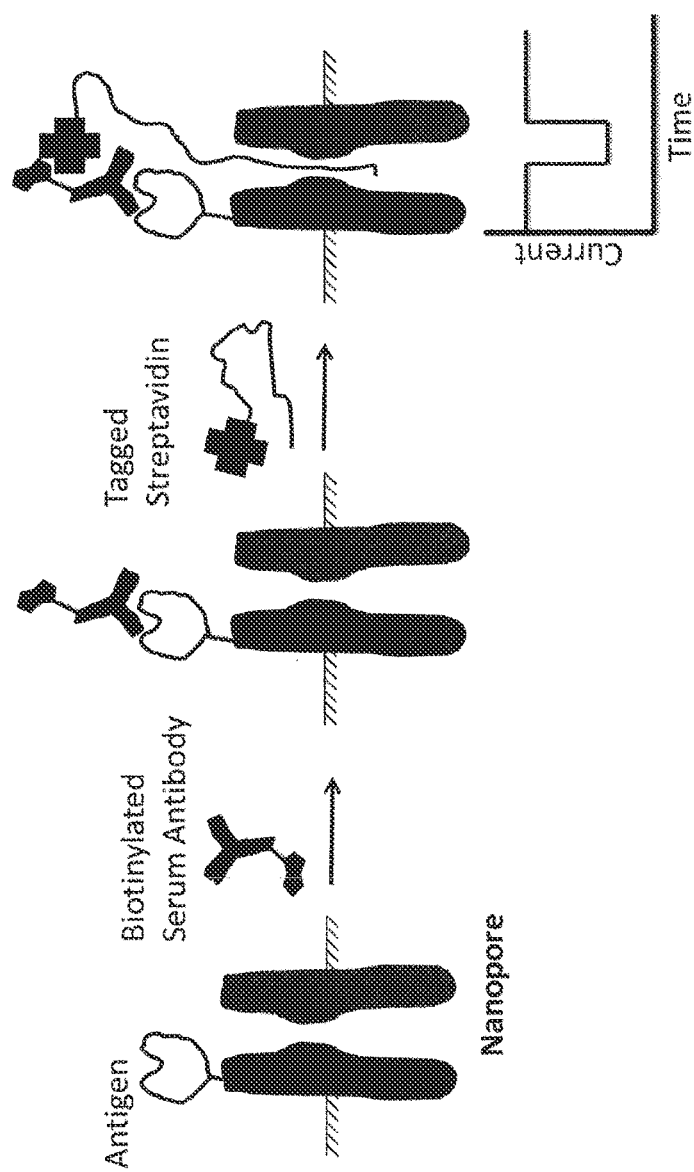
FIG. 11B: Nanopore detection of serum antibodies using biotin-streptavidin interaction between serum antibody and tag. In this embodiment, serum antibodies are biotinylated, and streptavidin is attached to a nanopore-detectable tag. An antigen that can be recognized by the serum antibodies is attached to the nanopore using standard procedures. This antigen will capture the biotinylated serum antibodies. Next incubation with the tagged streptavidin will attach the tag to the complex on the nanopore. A voltage gradient is applied across the membrane to capture the tag in the nanopore channel and the current is recorded. Recognition of its specific tag signal will reveal the presence of the antibody of interest. The placement of the biotin and streptavidin may be reversed.
Figure 11C:
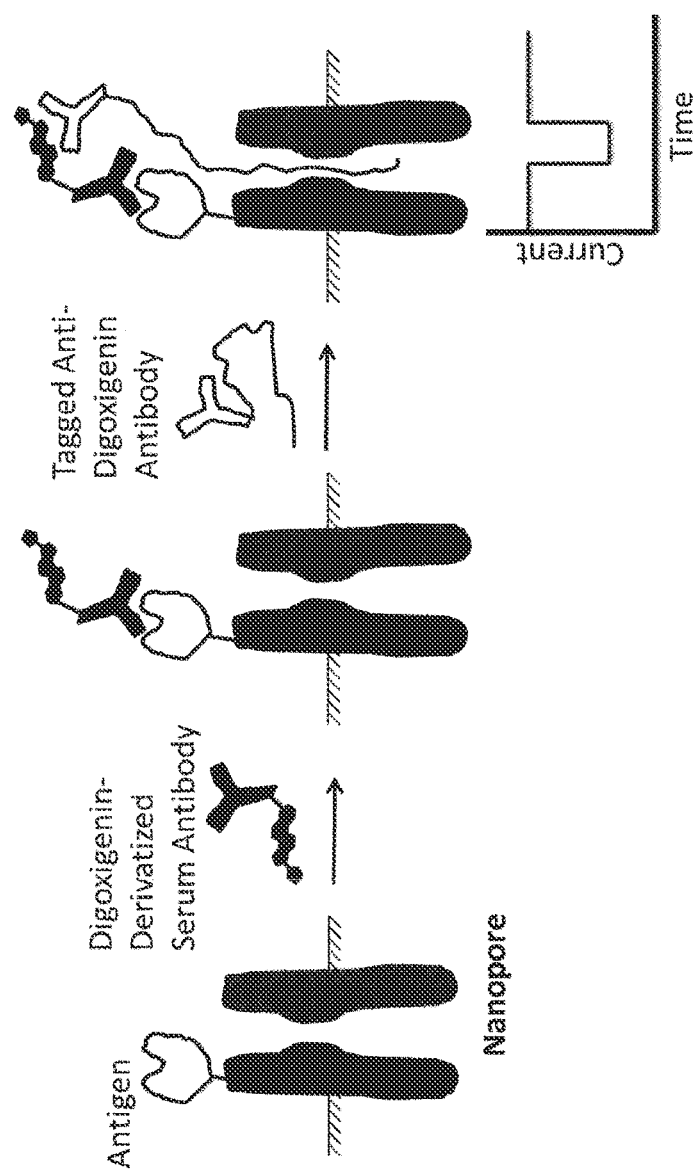
FIG. 11C: Nanopore detection of serum antibodies using digoxigenin-anti-digoxigenin antibody interaction between serum antibody and tag. In this embodiment, serum antibodies are derivatized with digoxigenin, and anti-digoxigenin antibodies are attached to a nanopore-detectable tag. An antigen that can be recognized by the serum antibodies is attached to the nanopore using standard procedures. This antigen will capture the digoxigenin-derivatized serum antibodies. Next incubation with the tagged anti-digoxigenin antibody will attach the tag to the complex on the nanopore. A voltage gradient is applied across the membrane to capture the tag in the nanopore channel and the current is recorded. Recognition of its specific tag signal will reveal the presence of the antibody of interest. The placement of the biotin and streptavidin may be reversed.
Figure 12:
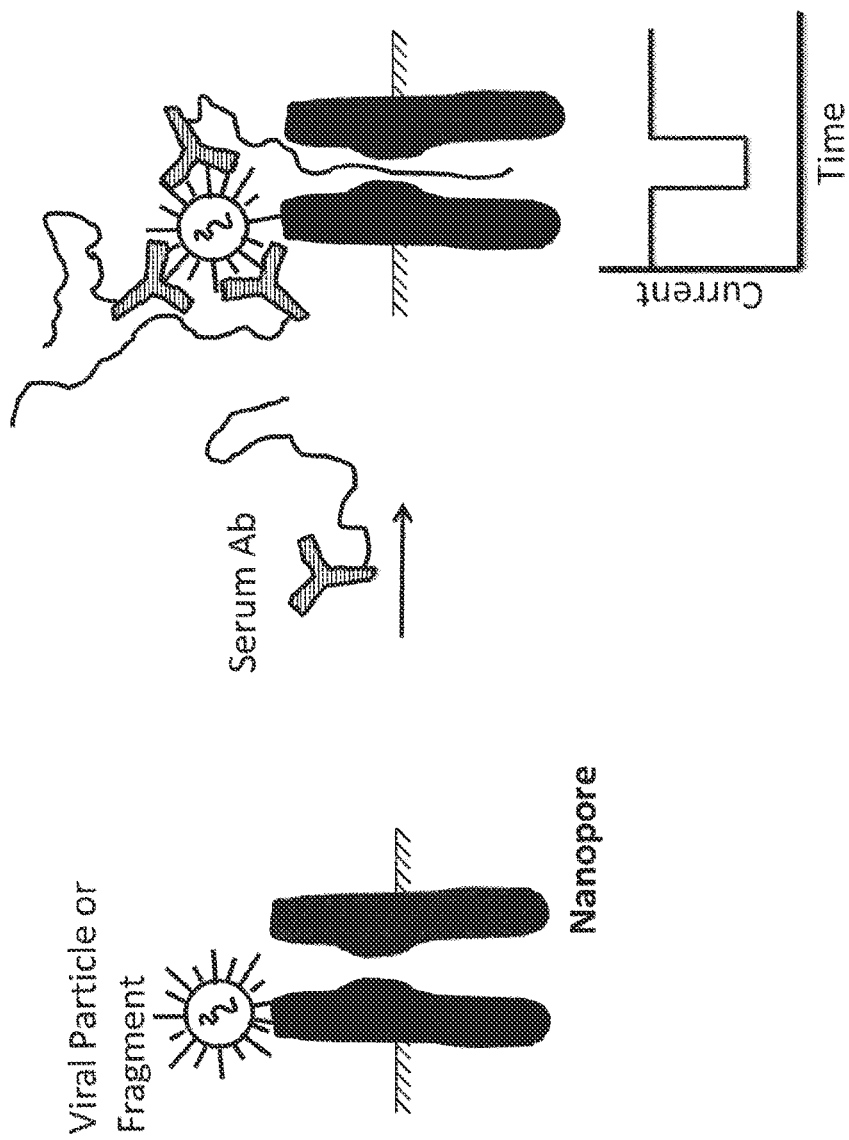
FIG. 12: Nanopore detection of serum antibodies using viral particle attached to nanopore and tagged primary antibody to viral coat proteins. In this approach, the proteins in the serum including any viral antibodies are conjugated with a nanopore-detectable tag. The nanopores are conjugated to viral particles or viral particle fragments via a chemical linker, for instance, via a biotin-streptavidin interaction. Tagged serum antibodies raised against viral coat proteins due to current or prior viral infection are attracted to the viral particles on the nanopore. These antibodies are revealed thanks to the presence of the nanopore tag which produces an ionic current blockade when the tags are captured in the nanopore channel following application of a voltage across the membranes.
Figure 13:
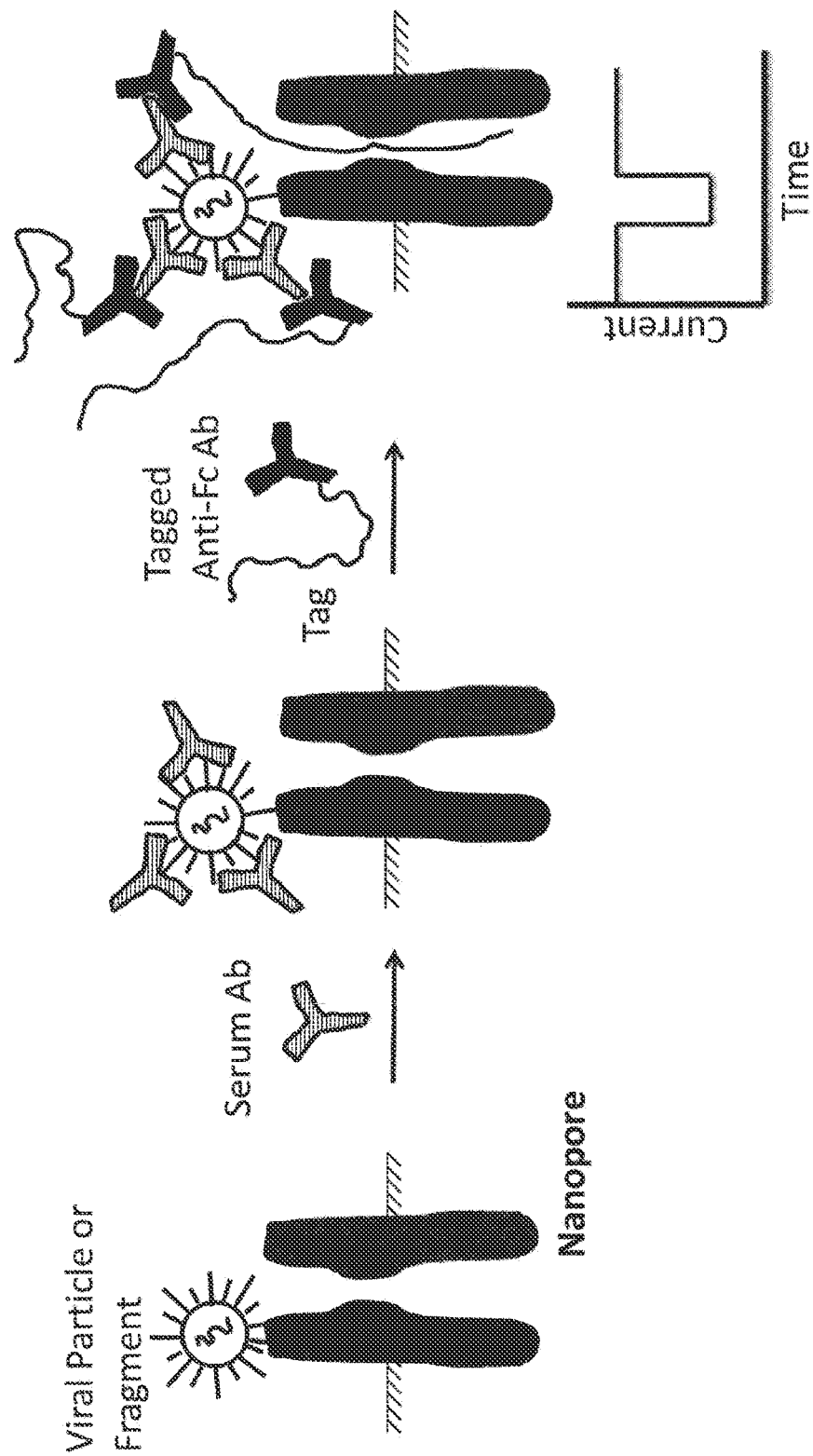
FIG. 13: Nanopore detection of serum antibodies using viral particle attached to nanopore and tagged secondary antibody. In this alternative to the scheme shown in FIG. 12, the proteins in the serum are left untagged; instead, a nanopore-detectable tag is conjugated to secondary antibodies raised to the Fc portion of the serum antibodies. The nanopores are conjugated to viral particles or viral particle fragments attached to the nanopore via a chemical linker, for instance, via an interaction between biotin and streptavidin. Serum antibodies raised against viral coat proteins due to current or prior viral infection are attracted to the viral particles on the nanopore. These antibodies are revealed thanks to the presence of the nanopore tag on the secondary antibody which produces an ionic current blockade when the tags are captured in the nanopore channel following application of a voltage across the membranes.

Example 8: Detection of Antibodies in Serum or Tissues. In infectious disease studies, rapid detection of circulating antibodies to the virus, bacterium or other agent is often highly desirable for early diagnosis, as growing and identifying the infectious agents can often take several days, and in some cases may not be possible. An example of the use of a novel ELISA approach for such a purpose has been described recently (Ng et al. (2018)). Similarly, the single-molecule nanopore system described herein can easily be adapted for that purpose and will be especially useful when assaying for several potential infectious agents in a patient. In the simplest scenario, the antigen of interest (e.g., a coat protein on the virus, an immunogenic component of a bacterial cell), can be attached to or near the nanopore by any of the methods outlined above (FIG. 10A) including the use of biotin-streptavidin (FIG. 10B) or digoxigenin-anti digoxigenin antibody (FIG. 10C) interactions. Thus the antigen itself will serve as the capture reagent (FIGS. 10A, 10B and 10C). In combination with a flexible linker, this method of attachment will further increase binding affinities, reduce molecular crowding, and increase access for subsequent binding steps. Next, the serum with putative antibodies will be added to the chip. Practically all serum proteins including any serum Ig's would be tagged, in which case, the bound antibody will have a tag that can be immediately detected in the nanopore. To select for the serum Ig's of interest, thus reducing complexity, in an alternative strategy, one can use a nanopore tagged secondary antibody to the captured antibody, either directed against the Fc portion and raised in a different species (e.g., a goat-anti human antibody (secondary antibody)) (FIG. 11A), or in cases where the antibody of interest has been well characterized, an anti-idiotypic antibody, which adds further specificity and allows multiplexing for different serum antibodies on the same nanopore array chip. Having a collection of tagged secondary anti-Fc or anti-idiotypic antibodies avoids the serum tagging step and reduces costs. As an alternative to the secondary antibody, protein A or G could be used to bind to the primary antibody. Interacting molecules between the serum antibodies and the secondary antibody such as biotin-streptavidin (FIG. 11B) or digoxigenin-anti-digoxigenin antibody (FIG. 11C) can be used. In combination with a flexible linker, this method of attachment will further increase binding affinities, reduce molecular crowding, and increase access for subsequent binding steps. To increase sensitivity for viral or other antibody capture, viral particles (Ricks et al 2019) or fragments can be attached to the nanopore using amine-NHS or a wide variety of other reactivities, as mentioned above. Because there are many copies of the viral coat proteins on the viral particles or even viral particle fragments, this provides many sites for binding of serum antibodies. In one approach, the viral antibodies can be pre-tagged (non-specifically) (FIG. 12) and in a second approach the serum antibodies can be left untagged whereas tags will be present on secondary antibodies raised to the Fc portion of these primary antibodies (FIG. 13).

Figure 18:
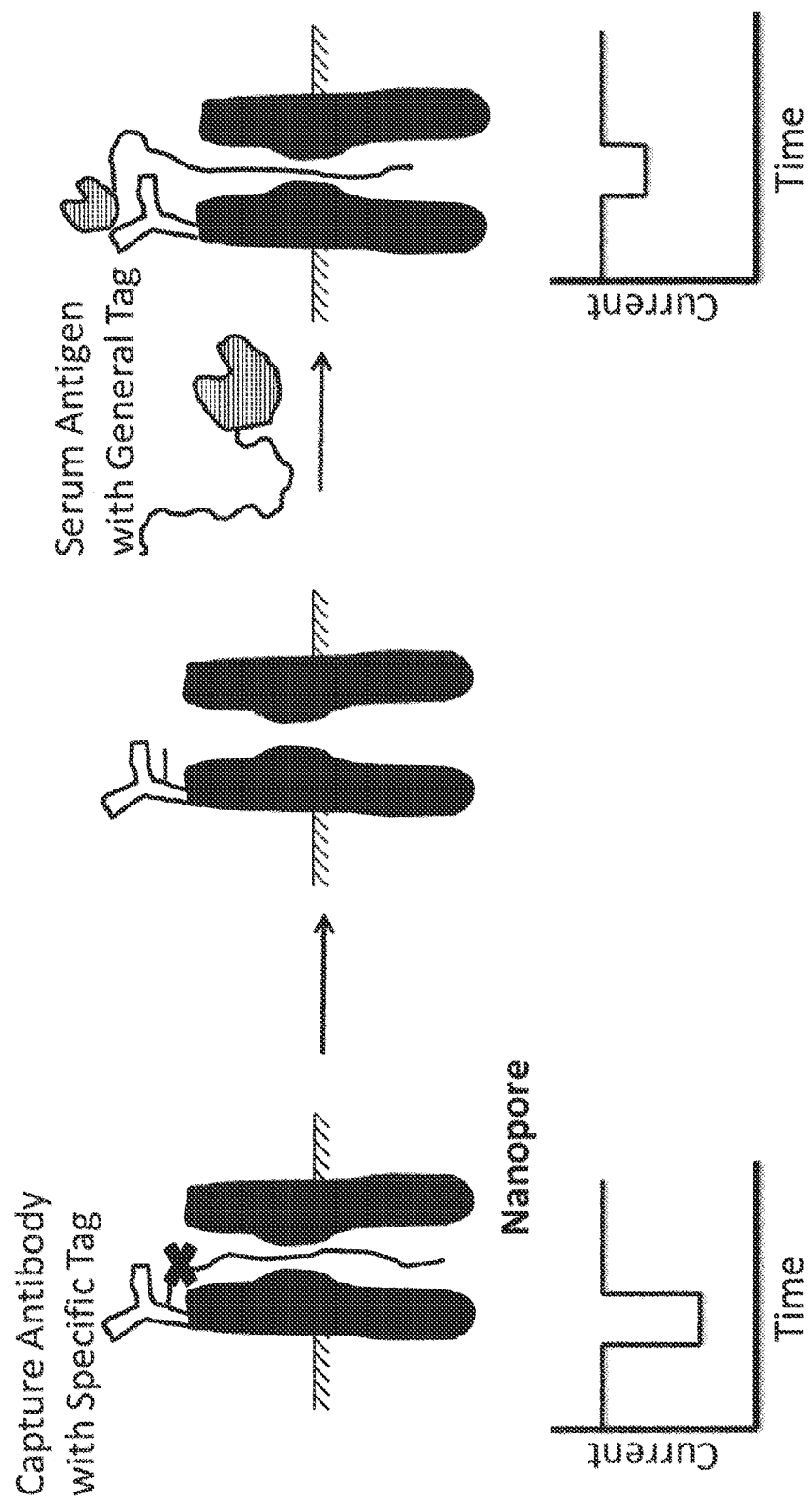
FIG. 18: In this embodiment a capture antibody for a specific target molecule is attached to a specific nanopore tag via a cleavable linker. A voltage gradient is applied across the membrane to capture the tag and the current is recorded. Recognition of the tag signal will reveal which capture antibody is present at that position of the array. The tag is cleaved, and this antibody is used to capture specific target molecules from the serum or other source. The assortment of different target molecules in the serum is pre-labeled with a general nanopore tag distinct from the specific tags on the capture antibodies. A voltage gradient is again applied across the membrane to capture the new tag and the current is recorded. The initial current recording indicates which antibody is present and thus which target molecule can bind, and the second current indicates actual binding of that target molecule. Counting of such combined events across the chip will reveal the relative quantities of different target molecules in the serum. (If the tag on the antibody is not cleaved, applying pulsed voltages across the membrane will result in the second recording being a series of both specific tag and general tag readings.)

As described in Example 12, this method can be adapted for quantitation of one type or multiple types of viral antibodies, by prior labeling of the viral particles or viral proteins bound to the nanopores with a cleavable tag specific for the antigen. After detection of signals due to capture of this tag to identify which viral antigen is present on a given nanopore overlying a particular sensor of a nanopore array, the tags are cleaved as in FIG. 18. Then the nanopore array chip is incubated with the serum to capture the non-specifically tagged viral antibodies (FIG. 12) or untagged viral antibodies followed by non-specifically tagged secondary antibodies (FIG. 13) and the non-specific tag signals detected. Thus, the initial tag defines the viral antibody that can be detected at that position on the array and the second tag indicates whether that antibody is indeed present.

Figure 9:
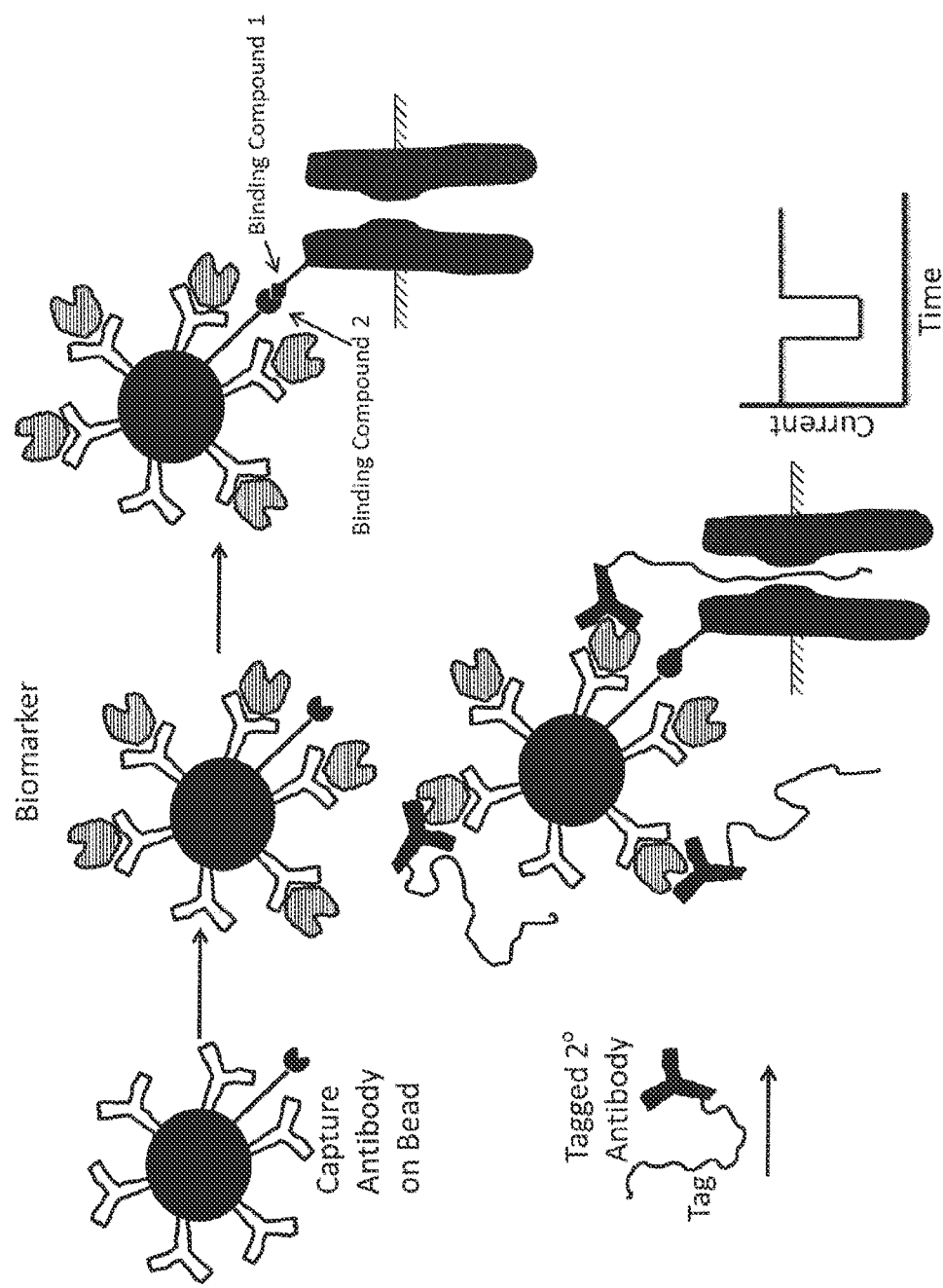
FIG. 9: Use of capture antibody-decorated magnetic beads to fish out biomarkers of interest. In this embodiment, magnetic beads studded with antibodies are mixed with the sample to capture target biomarkers. The beads are collected and conjugated either directly or via a chemical linker (interaction between Binding Compound 1 such as biotin and Binding Compound 2 such as streptavidin) to the nanopore which is inserted into a lipid membrane. Subsequent binding of tagged detection antibodies allows determination of the biomarker at a given position on the array. This method is designed to increase sensitivity.

As an example of a specific implementation of the approach, killed Rubella (German measles) or Rubeola (measles) virus particle coated nanopores or nanopores derivatized with Rubella or Rubeola antigens will be used in a microfluidic station to capture the related tagged antibodies in a blood sample. The sample will be diluted in PBS supplemented with 4% BSA and 0.1% Tetronic 90R4 exposed to nanopore coated with the viral particles or antigens and washed four times with PBS/Tetronic 90R4 in the microfluidic device. After washing, the antibodies can be detected as shown in FIG. 9. For multiplexing, the derivatized nanopores will also bear a cleavable nanopore tag specific to the Rubella or Rubeola virus. After cleaving and detecting the tag to determine which antigen is present at each position in the nanopore array (the tag may be directly attached to the nanopore or to the antigens on the nanopore), the chip will be incubated with either serum antibodies labeled with a non-specific tag as in FIG. 12 in PBS/BSA/Tetronic 90R4, or unlabeled serum antibodies followed by a secondary antibody conjugated with a non-specific tag (as in FIG. 13), both in PBS/BSA/Tetronic 90R4, to reveal the presence/absence and titer of the viral antibodies in the serum sample. Attachment of the virus particles to the nanopore is accomplished using standard approaches described above or through site specific mutagenesis of amino acids (Chatterjiee et al 2004).

Figure 14:
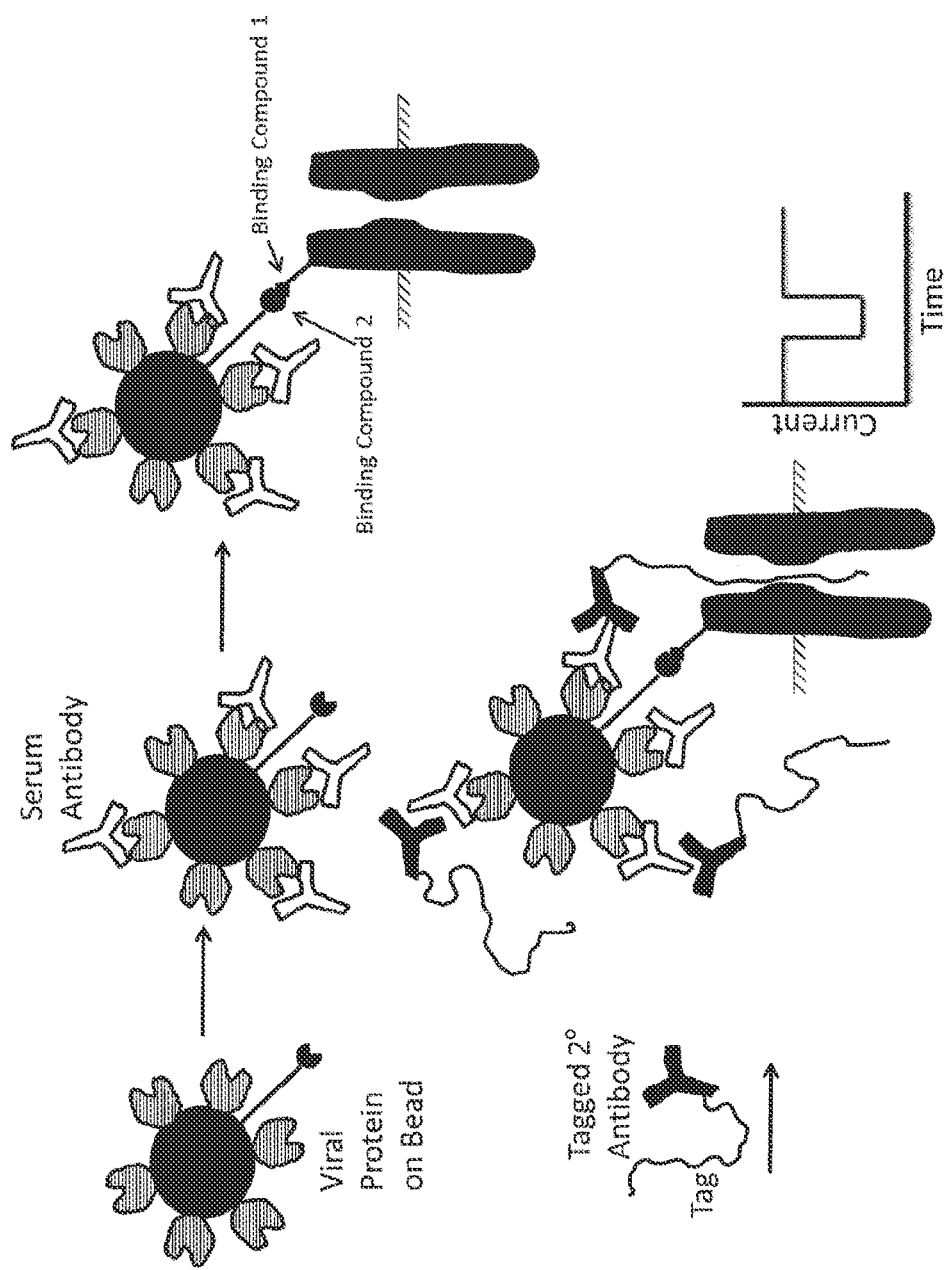
FIG. 14: Use of viral antigen decorated magnetic beads to fish out anti-viral antibodies present in serum or other samples due to viral infection. In this embodiment, magnetic beads studded with viral proteins are used to capture antibodies in serum. After chemical linkage of the complex to the nanopore via interaction between Binding Compound 1 such as biotin and Binding Compound 2 such as streptavidin, tagged secondary antibodies to the Fc portion of the captured antibodies (e.g., goat-anti-rabbit antibodies) are used to determine the presence of the anti-viral antibodies. The method has the potential to increase sensitivity.

This method also can incorporate viral protein studded magnetic beads (FIG. 14) (Ng et al. (2018)). In this case the beads with the viral protein clusters would be mixed with the blood or other sample as a method of capturing multiple copies of the antibody for the given viral protein. The magnetic bead would also have chemical substitutions on its surface for binding to or near the nanopore. The resulting complex is inserted into the membrane on the nanopore array, one nanopore per sensor position. Finally, the array will be incubated with secondary antibodies targeted to the initial antibodies and labeled with a nanopore detectable tag specific for the target of interest. Application of a voltage across the membrane will allow capture of the tag and determination of the presence of the viral (or other) antibody of interest based on the resulting current blockade signal. The advantage of this approach is that even antibodies present in the serum in very low concentrations would have a high likelihood of being detected given the large number of antigenic (viral) proteins on the magnetic bead. Thanks to the use of this sandwich approach, multiple tagged secondary antibodies will be bound, also increasing the likelihood that the tags will enter the nanopore channel to produce the desired signature. Clearly, with the use of different beads bearing proteins from different viruses, the same chip can be used to detect different viral targets at high sensitivity on the same chip. Further, with a mixture of viral-specific tags on the beads or antigens, and non-specific tags on a secondary antibody, quantitative or semi-quantitative multiplexing can be accomplished. The preparation of the capture antibody attached beads and their attachment to the nanopore is described in Example 7.

Figure 15:
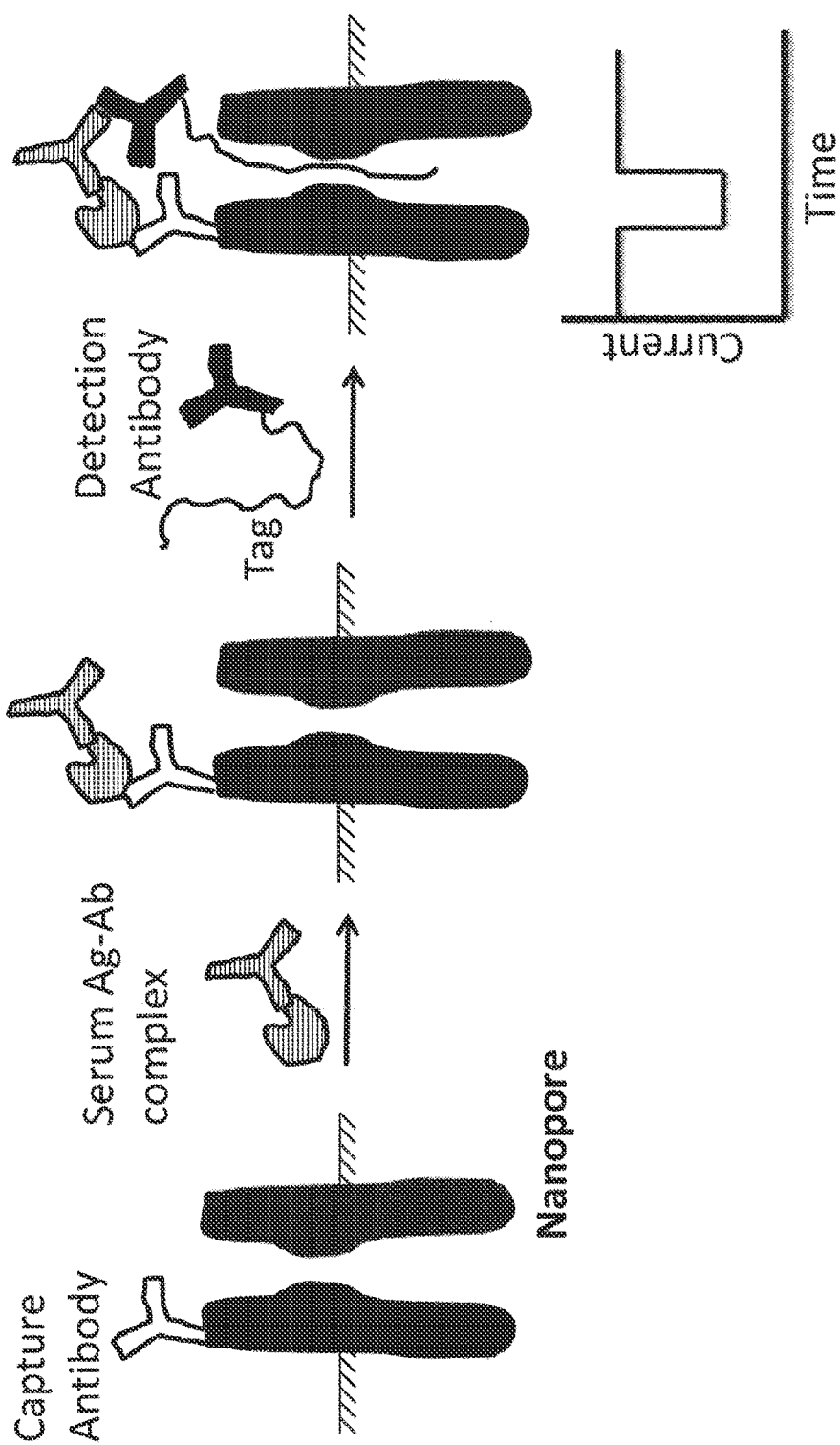
FIG. 15: Nanopore detection of antigen-antibody complexes in serum using capture and tagged detection antibodies. In this embodiment, a capture antibody is bound to the nanopore and used to capture specific serum antigen-antibody complexes. Next a tagged secondary antibody (one raised to the Fc portion of the captured antibody in the complex) is flowed over the nanopore chip. A voltage gradient is applied across the membrane to capture the tag and the current is recorded. Recognition of the tag signal will reveal the presence of the antigen-antibody complex of interest in the serum sample. This approach may be further modified with the use of magnetic beads containing a capture antibody cluster to further increase sensitivity. While a single capture antibody is shown here, multiple copies of the capture antibody or small antibody mimetics may be attached to the nanopore.

A further variation of the above approach for detection of antigen-antibody complexes, commonly found in serum during the course of autoimmune and other diseases, that is closer to the more general approach described herein involves the use of both a capture antibody attached to or near the nanopore and a detection antibody (FIG. 15). This capture antibody would pull out potential antigen-antibody complexes from the serum. Subsequently a tagged anti-Fc or anti-idiotypic antibody raised to the antibody in the antigen-antibody complex will be flowed over the chip, and a tag-dependent ionic current blockade event will reveal the presence of the antigen-antibody complex in the serum. This variation can optionally include the use of antibody-coated capture beads to further increase sensitivity. Also, instead of using an antibody attached to or near the nanopore as the capture reagent to pull antigen-antibody complexes from the serum, one could use the antigen as the capture agent. In this case, after binding the antibody-antigen complex, a tagged second antibody to the serum antigen will be used for detection.

If the antigen or capture antibody is attached near, rather than to the nanopore, the tag will be connected to the detection antibody via a cleavable linker to allow the released tag to reach the nanopore channel. Capture and detection antibodies can be replaced with antibody mimetics if desired. Antibody mimetics are generally substantially smaller than antibody molecules. This can be taken advantage of to increase the likelihood of capture and thus sensitivity, by attaching multiple copies of the antibody mimetic to or near the nanopore, generally via flexible linkers.

Finally, as above, the immunodetection reactions can be performed either directly on the nanopore array, or in solution in a microfluidic chip and then inserted into the membrane of the array for detection.

Example 9: Multiplexing and Quantitation of Target Molecules. By definition the nanopore ionic current measurements are at the single molecule level, assuming that a single nanopore is inserted into the membrane above each sensor. With different antibodies (for different target biomarkers) attached to different nanopores, assuming no cross-reactivity of either the capture or detection antibody with other than the desired antigen, the system can be set up for multiplexing, quantitation or both. For example, using separate flow cells covering different portions of the chip, nanopores with a different capture antibody (for a specific target biomarker) can be placed in each flow cell, resulting in separate regions of the chip each with their own capture antibody. The same sample would then be added to each flow cell, so that specific antigens in the sample would attach to the specific capture antibodies. In the third step, the tagged detection antibody could be added to all the flow cells or to just the flow cell containing the capture antibody for the same antigenic protein or other antigen. With separate flow cells, each detection antibody can be labeled with the same tag.

Figure 16:
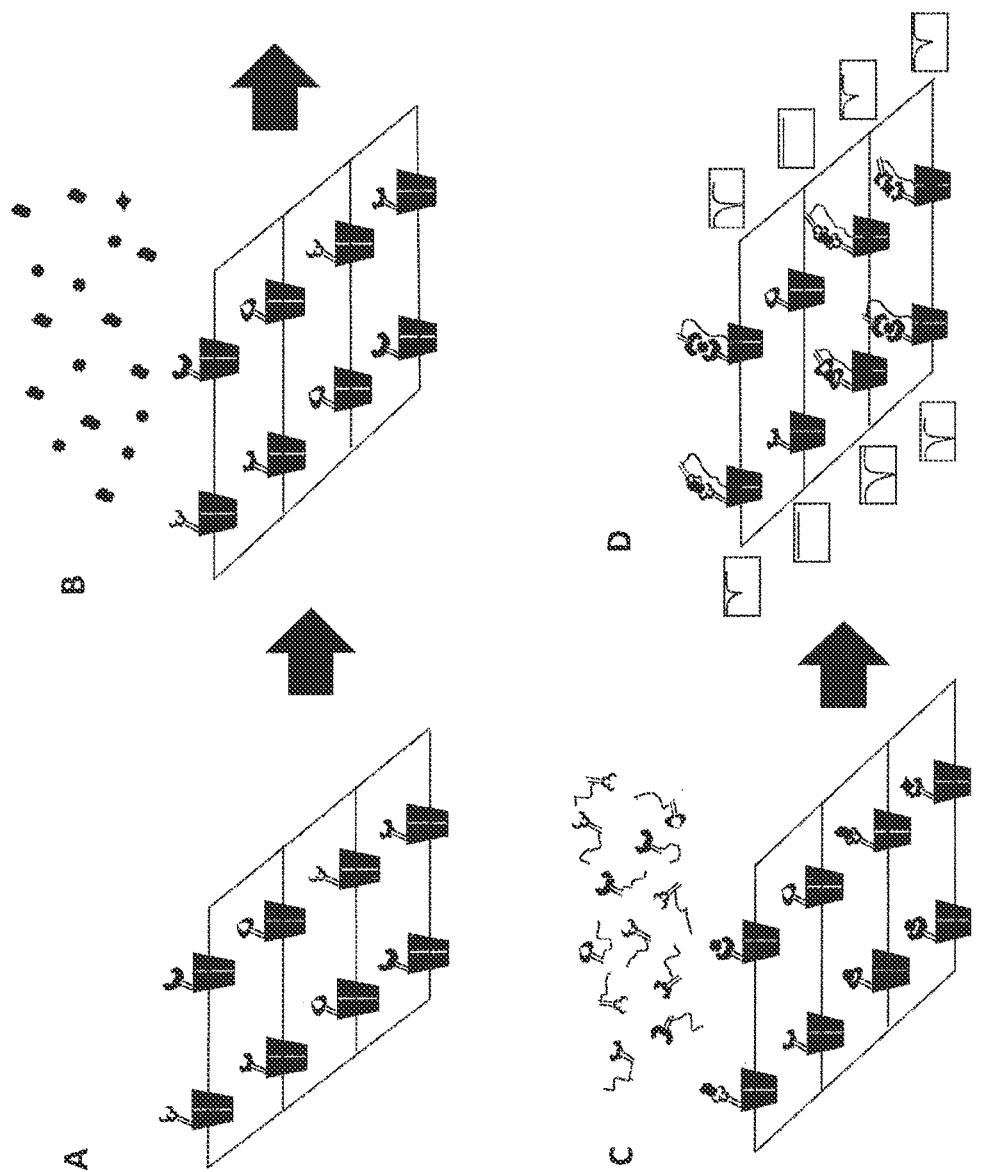
FIG. 16: Multiplexing and Quantitation of Target Proteins Using a Nanopore Array. Example of the protocol shown in FIG. 1, with capture antibodies for different targets distributed in equal proportions across the nanopore array in random positions; these positions are unknown at the start of the experiment (A). After flowing in the sample with its mixture of targets and other molecules (B), an equimolar mixture of Nano-Tag Detection Antibodies for the different targets is flowed onto the array (C). These tagged antibodies will bind to the targets, which are already bound to the capture antibodies according to their ratio in the sample. Applying a voltage across the membranes will allow capture of the tags by the single nanopore associated with each position on the array, and the resulting blockade currents illustrated by the different depths of the dips in the traces adjacent to each nanopore, indicative of the different tags, will determine which target protein was captured at each position (D). With a large enough array, by simply counting the number of positions displaying each blockade current, one can determine the ratio of the target proteins in the sample. Note that when target does not bind to the capture antibody, an open channel current is obtained since there is no associated tag.

In an alternative scheme to maximize the ability to quantitate antigen ratios, illustrated in FIG. 16, an equimolar mixture of capture antibody-bound nanopores (each for a different target biomarker) can be flowed over the entire chip. Then the sample containing antigens and an equimolar mixture of the tagged detection antibodies (for the same collection of target biomarkers), each with a unique tag, will be flowed over the chip. Because this nanopore-based approach is single molecule (digital), quantitation can be carried out by simply counting the number of sensors reporting the appropriate tag. Assuming the capture antibody-nanopores insert into the membranes with equal efficiency, and the antibodies have equal affinity for their respective antigenic targets, this approach will be highly quantitative. Thus if 1000 sensors display currents indicative of tag 1, 100 sensors display currents indicative of tag 2, and 10 sensors display currents indicative of tag 3, then one can assume with a reasonable level of confidence that the sample contains a 100:1.0:1 ratio of the antigenic biomarker targets 1, 2 and 3. If some of these assumptions are not correct, the system can be calibrated accordingly. For example, if some antibodies have a higher affinity, their fraction in the antibody mixture will be reduced proportionately.

An important consideration with all multiplexing methods is that the use of even just 4 distinguishable tags in two different steps can reveal up to 16 different features (e.g., representation of 4 analytes in 4 different tissues or 4 different functional or developmental states of the same tissue).

Example 10: Alternative Protocol with Antibody Attached Near the Nanopore and Cleavable Linker between the Tag and $2^{nd}$ Antibody: One variation of the above approach comprises attachment of the antibody near the nanopore rather than directly to the nanopore. For instance, if microfabricated wells separate the sensors and associated membranes, the capture antibody may be attached directly to the surface of the well using traditional surface conjugation techniques. For instance the surface can be modified with a variety of reactive groups (amino, NHS ester or carboxylic acid, alkyne, tetrazine, biotin, etc.) and the antibody modified with partner reactive groups (carboxy, amino, azide, TCO, streptavidin, etc.). Coupling will be accomplished under conditions well known in the art. Alternatively, the capture antibody can be attached directly to the membrane, taking advantage of reactions between phospholipids, artificial lipid polymers, or modified lipids with associated reacting chemical moieties on the antibody. In either case, it is highly unlikely that after incubating with the antigen and the detection antibody, tagged as described earlier, the position of the tag in the resulting surface or membrane-capture antibody-antigen-detection antibody-tag complex will be close enough to reach and extend into the nanopore channel. To overcome this obstacle, the tag can be attached to the $2^{nd}$ antibody through a cleavable linker. After cleavage, the tag is provided sufficient time to be drawn with the aid of the electric field into and through the nanopore channel. This may require a different concentration of electrolytes and a higher voltage than in the basic protocol.

The steps of this alternative protocol are thus as follows: (1) incubation of the derivatized chip or membrane surface, already containing embedded nanopores, with the appropriately derivatized capture antibody; (2) incubation of the chip with an antigen-containing sample; (3) incubation with the cleavably tagged detection antibody in an electrolyte solution; (4) cleavage of the cleavable linker with appropriate chemical or other cleavage agent to release the tag; and (5) application of a voltage across the membranes and measurement of the resulting ionic current: transient ionic current blockade indicative of tag entry into the nanopore channel will indicate binding of target antigen to the complex.

As with the basic protocol, wash steps to remove prior unbound or unconjugated molecules will be carried out as needed between steps. To greatly improve the likelihood that tags will be captured by the nanopore, many copies of the same capture antibody can be used to decorate the surface or membrane in the vicinity of the nanopore, or the capture antibodies can be clustered on beads attached to the surface. It is also important in these circumstances to have rapid sensing, since the tags will pass through the nanopore channels at high speeds (in the order of nanoseconds to hundreds of nanoseconds depending on e.g., the nature of the tag, ion composition of the buffer, and the applied voltage).

A variety of cleavable groups that can be placed in linkers have been described, for each of which specific and protein compatible cleavage agents exist. Examples have been described involving biomarker sensing with nanopores (U.S. 2016/0041179 A1), where cleavable linkers have been designed and placed in a variety of molecules for assorted purposes including sequencing by synthesis using fluorescent tags and anchors (U.S. 2016/0090621 A1), attachment of biotin to primers for enrichment of ternary complexes (U.S. 62/643,633), etc. Importantly, sulfhydryl or other groups that undergo cleavage with reducing agents should be avoided, as these groups can affect immunoglobulin (antibody) subunits, potentially altering their binding properties so that they no longer bind with sufficient affinity to the antigens. Other cystine (linked cysteine)-containing proteins can be similarly affected by reducing reagents. FIG. 17 includes examples of cleavable linkers that can be used to attach tags to antibodies or other molecules for the protocols described herein.

Example 11: Additional Methods for Detecting Multiple Target Molecules: In this variation (FIG. 18), a specific tag is attached to the capture antibody for a given target molecule. Different specific tags are attached to capture antibodies for different target molecules. The nanopore-tagged capture antibody conjugates are flowed over the array, where nanopores bearing different tagged capture antibodies will insert randomly into membranes in different sites on the chip, at approximately their ratio in the solution. The tags are attached to the capture antibody via a cleavable linker (examples of cleavable groups are presented in FIG. 17). A voltage is applied across the membranes. After obtaining recordings at each position to establish which capture antibodies are associated with each position in the array, the tags are then cleaved as described previously (U.S. 2016/0041179 A1). Isolated antigenic biomarkers present in the sample, which are pre-labeled with a general purpose nanopore detectable tag (different from any of the specific ones that were attached to the capture antibodies), are flowed over the chips, and bind to the appropriate capture antibody. A voltage is again applied across the membranes, and new current readings obtained. The presence of a blockade current due to the general purpose antigen tag is indicative of antigen binding. Since it is already known which capture antibody is present at that site on the chip from the first recording, the specific antigen that has bound can be determined. Thus, at each position on the array for which the specific capture antibody that was present due to the first recording is known, the second recording indicates binding of antigen, and counting all such cases (presence of both a specific and a general tag current) indicates the relative amounts of different antigens in the sample. An alternative method (not illustrated) would be the use of a non-cleavable tag on the capture antibody. In this case, subsequent binding of the antigen with its general tag would result in a competition for entry of the general and specific tags in the channel of the nanopore with repetitive voltage applications (pulses) across the membrane. The current traces for a given well would present as a mixture of blockades due to the specific tag and the general tag, in contrast to the initial recording with just the specific tag current blockade. Thus instead of a switch from specific tag blockade to general tag blockade, this variation would present as a switch from specific tag blockade to a mixture of specific and general tag blockades.

Figure 19:
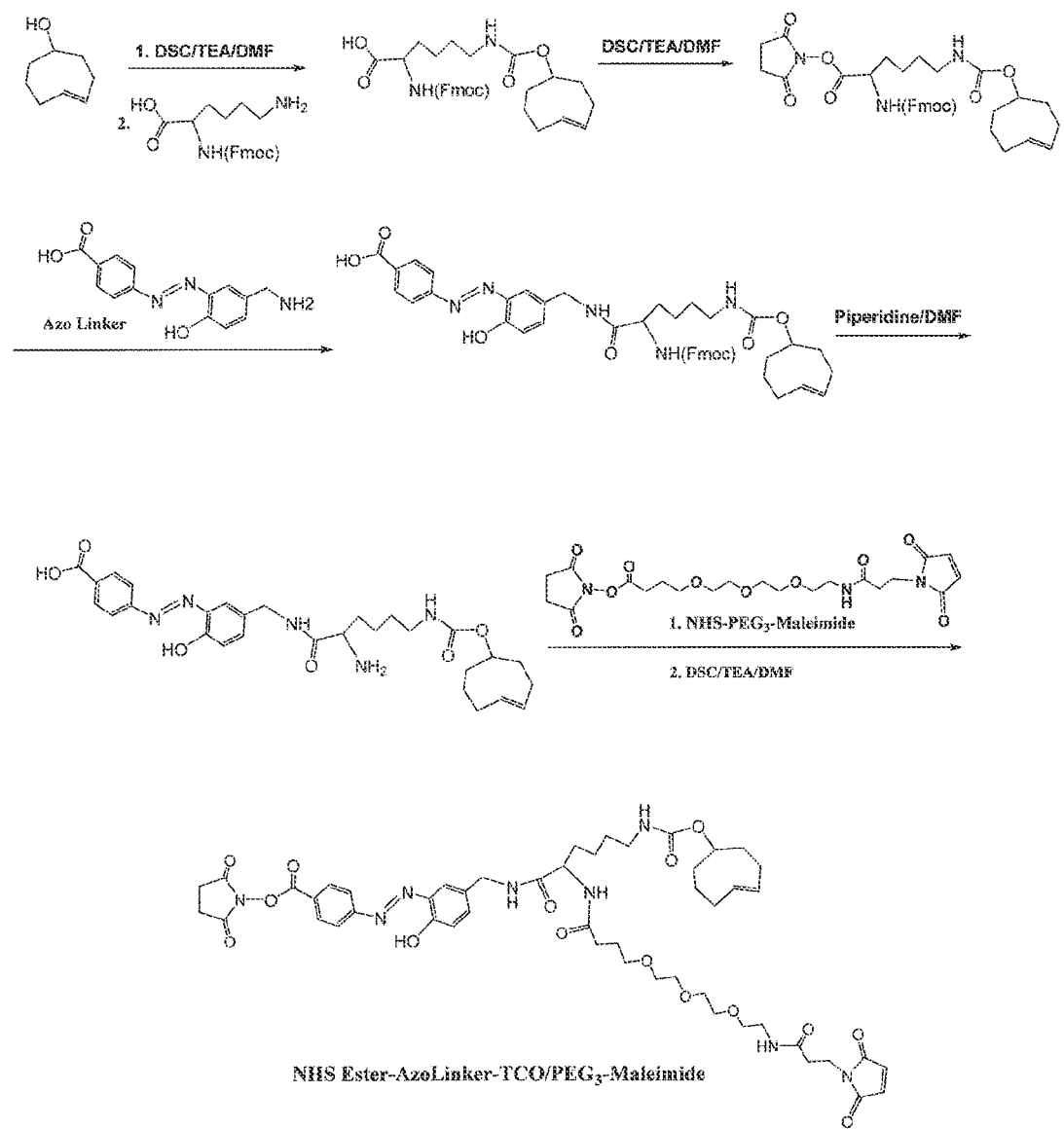
FIG. 19: Synthesis of a cleavable trifunctional linker, NHS ester-Azo-TCO/PEG3-Maleimide. TCO is first coupled to Fmoc protected lysine, which can be further coupled to an Azo Linker via carboxylic acid activation and amide bond formation. Removal of the Fmoc group allows one more coupling step with maleimide NHS ester. The subsequent activation of the azo linker acid affords NHS ester-Azo-TCO/PEG3-Maleimide.
Figure 20:
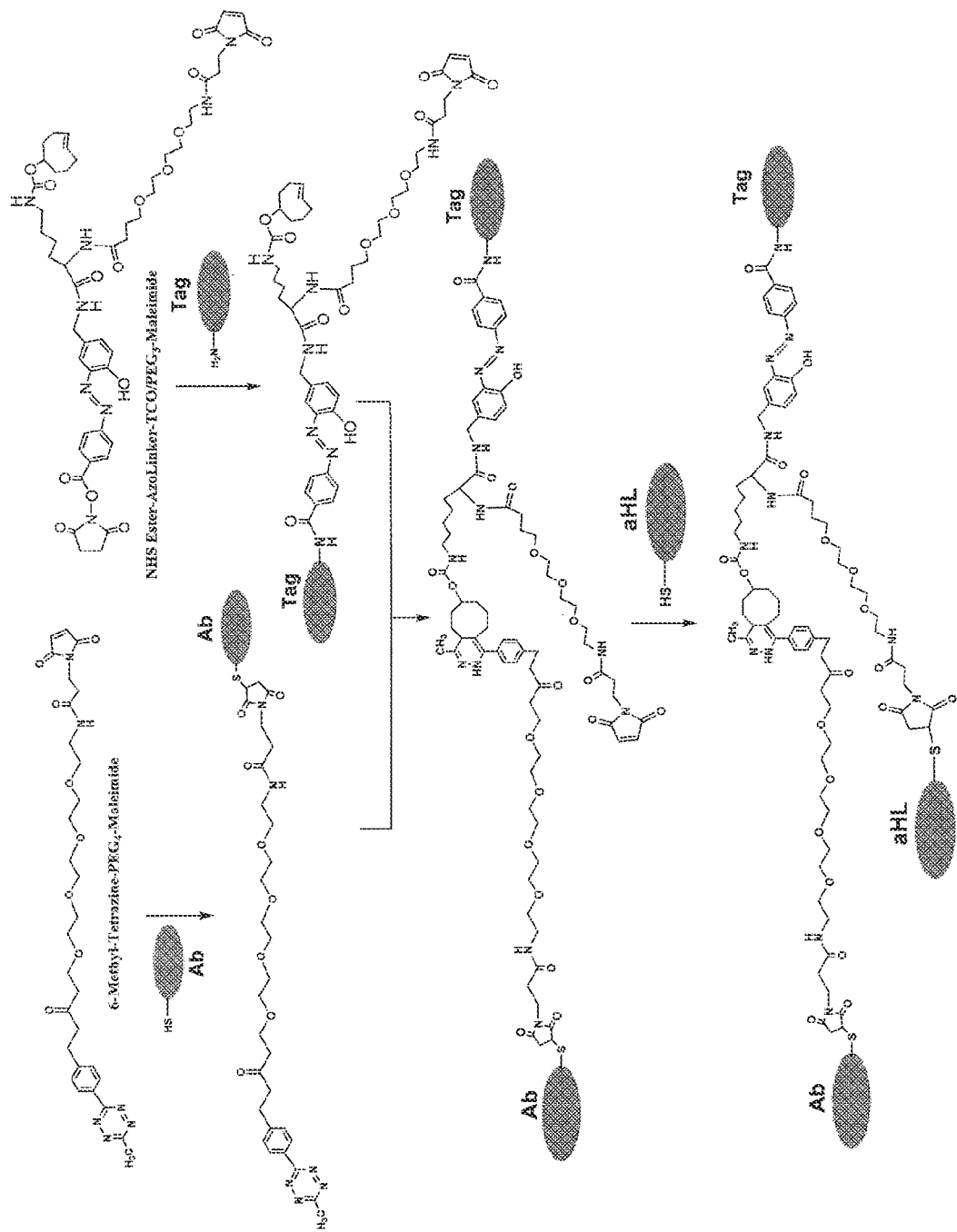
FIG. 20: Preparation of nanopore-capture antibody-cleavable tag conjugate. The cleavable trifunctional linker synthesized in FIG. 19, NHS ester-Azo-TCO/PEG3-Maleimide, is reacted with amino-Tag yielding a Tag-Azo-TCO/PEG3-Maleimide conjugate, which can readily react with Tetrazine modified capture antibody through TCO-Tetrazine addition. The resulting Tag-Azo-Capture Antibody-Maleimide conjugate is further reacted with α-hemolysin-SH via thiol-ene addition, affording the Nanopore-Cleavable Tag-Capture Antibody conjugate in which the Tag can be removed by Azo reduction and cleavage upon sodium dithionite treatment.

The preparation of the nanopore with capture antibody and cleavable tag is illustrated in FIGS. 19 and 20. First a cleavable trifunctional linker, NHS ester-Azo-TCO/PEG3-Maleimide, is synthesized (FIG. 19). TCO is first coupled to Fmoc protected lysine, which can be further coupled to an Azo Linker via carboxylic acid activation and amide bond formation. Removal of the Fmoc group allows one more coupling step with maleimide NHS ester. The subsequent activation of the azo linker acid affords NHS ester-Azo-TCO/PEG3-Maleimide. Next the nanopore-capture antibody-cleavable tag conjugate is prepared (FIG. 20). The above cleavable trifunctional linker, NHS ester-Azo-TCO/PEG3-Maleimide, is reacted with amino-Tag yielding a Tag-Azo-TCO/PEG3-Maleimide conjugate, which can readily react with Tetrazine modified capture antibody through TCO-Tetrazine addition. The resulting Tag-Azo-Capture Antibody-Maleimide conjugate is further reacted with α-hemolysin-SH via thiol-ene addition, affording the Nanopore-Cleavable Tag-Capture Antibody conjugate in which the Tag can be removed by Azo reduction and cleavage upon sodium dithionite treatment.

This format is flexible, and thus would not be limited to detecting a particular category of target molecule (a protein, a nucleic acid, a small molecule, etc.) on a given chip. It would be feasible to simultaneously detect protein and DNA biomarkers, for instance, by the use of appropriate combinations of antibodies, aptamers (Lakhin et al 2013) or other molecules for specific binding of these biomarkers.

In an exemplary embodiment of Example 11, the capture antibodies and detection antibodies can be directed against a multiplicity of cancer markers comprising PSA, MUC-1, carcinoembryonic antigen, CA-125 and estrogen receptor (Gam 2012, Mueller et al 2018).

Example 12: Method for Detecting Multiple Viral Antibodies: Just as one can use cleavable tags and multiple capture antibodies with cleavable tags for multiplexing of target molecules (Example 11), multiple types of viral antibodies in serum can be detected using cleavable tags and viral antigens as capture reagents. In this case, this method can be adapted for quantitation of one type or multiple types of viral antibodies, by prior labeling of the viral particles or viral proteins bound to the nanopores (via methods similar to those described for attaching antibodies or beads to the nanopore) with a cleavable tag specific for the antigen. The nanopores with the attached tagged antigens are then inserted into membranes, one per sensor n an array chip. Upon applying a voltage across the membranes, the tag will be captured by its respective nanopore, to generate a specific ionic current blockade signal. This will reveal which antigen is attached to the nanopore in each position. After the first detection step, the tags are cleaved. Then the nanopore array chip is incubated with the serum or serum protein extract to capture the viral antibodies, either non-specifically tagged ones as in FIG. 12, or untagged viral antibodies followed by non-specifically tagged secondary antibodies as in FIG. 13. A voltage is again applied across the membranes and the non-specific tag signals detected. Detection of a signal at this step will reveal the presence of the viral antibody, for which this nanopore is specific, as determined by the initial tag detection. Versions in which the first tag is attached not to the antigen on the nanopore, but to a position in the vicinity of the nanopore, such as the well surface or membranes, can also be envisioned but in this case the initial tag will be cleaved and detected transiently as it flows through the nanopore.

Example 13: Sample Multiplexing: In example 9 and 11, multiplexing and quantitation of antigens was described. However, the protocol also can be developed to compare multiple samples on the same chip. In the simplest version, the basic protocol of example 7, with antibody 1 (capture antibody) attached to the nanopore and tagged antibody 2 (detection antibody) is performed, but with samples from different tissues, treatments or patients are loaded into separate flowcells in equal amounts.

An approach has been previously described involving generalized tagging of any or all proteins or other antigenic targets in each sample, each sample with a different tag that can be distinguished in a nanopore (U.S. 2016/0041179 A1). In this case, there is no tagged detection antibody. A single capture antibody is attached to all the nanopores in the array, and then an equimolar mixture of the differentially tagged samples is added to the chip.

A variation of this approach is disclosed herein, which combines sample and antigen multiplexing. In this approach, a capture antibody specific for a given antigenic target is attached to or near the nanopore. A multiplicity of such antibodies is used for different antigens of interest, one of which will bind by chance to each nanopore. Next a set of several samples, each labeled with a unique cleavable tag that binds to the multiplicity of proteins or other targets present in the sample, are mixed together in equal amounts and added to the chip. After cleavage, the current attributable to this tag passing through the nanopore channel at each position on the array determines the sample from which the attached antigen was derived. Next, a detection antibody specific for a given antigen with a unique distinguishable nanopore tag is added to the array. A multiplicity of such differentially tagged specific antibodies is used and applied to the chip in equimolar amounts, adjusted as necessary according to the predetermined antibody affinities. Depending on whether capture antibodies 1 are directly attached to the nanopore or attached to the surface near the nanopore, the tag on sample detection antibodies 2 can be non-cleavable or cleavable, respectively. The ionic currents associated with this second set of tags will determine the specific antigen bound at each nanopore position on the array.

In an exemplary embodiment there are 5 samples (A-E) and 5 antigens (M-Q) of interest. Cleavable tags A, B, C, D and E would be used to label samples A, B, C, D and E, respectively. Because these are cleaved and pass through the nanopores, detection antibody for antigens M, N, O, P and Q can also be labeled with cleavable tags A, B, C, D and E, respectively. In the first set of recordings, the sample that the bound antigen was derived from will be determined, and in the second set of recordings, which actual antigen was bound will be determined. With sufficient numbers of nanopores, quantitation of the ratio of each antigen in each sample can be determined. As with all the above protocols, antibodies can be replaced with antibody mimetics, with interacting protein partners (ligand or receptor, etc.), and the targets may be proteins or other molecules, for instance any biomarker of interest.

REFERENCES

Ju J, Kumar S, Tao C, Kalachikov S, Russo J J, Method for Detecting Multiple Predetermined Compounds in a Sample, U.S. 2016/0041179 A1, published on Feb. 11, 2016.

Kalachikov S, Ju J, Morozova I, Dorwart M, Nucleic Acid Sequences Using Tags, U.S. 2017/0241948 A1, published on Aug. 24, 2017.

Ju J, Davis R, Chen R, Nucleic Acid Sequencing by Nanopore Detection of Tag Molecules, U.S. 2018/0073071 A1, published on Mar. 15, 2018.

Ju J, Li Z, Kalachikov S, Fuller C, Pore-Forming Protein Conjugate Compositions and Methods, U.S. Pat. No. 9,890,426 B2, issued on Feb. 13, 2018.

Fuller C W, Kumar S, Ju J, Davis R, Chen R, Chemical Methods for Producing Tagged Nucleotides, U.S. 2015/0368710 A1, published on Dec. 24, 2015.

Ju J, Kumar S, Tao C, Chien M, Russo J J, Kasianowicz J J, Robertson J W F, Method of Preparation of Nanopore and Uses Thereof, U.S. 2015/0111759 A1, published on Apr. 23, 2015.

Ju J., DNA Sequencing by Nanopore Using Modified Nucleotides, U.S. Pat. No. 8,889,348 B2, issued Nov. 18, 2014.

Ju J, Kumar S, Li Z, Tao C, Chien M, Russo J J, Kalachikov S, Shepard K, Rosenstein J K, DNA Sequencing by Synthesis Using Modified Nucleotides and Nanopore Detection, U.S. 2013/0264207 A1, published on Oct. 10, 2013

Ju J, Cho Y, Kumar S, Kalachikov S, Tao C, Chien M, Russo J J, Polymer Tagged Nucleotides for Single Molecule Electronic SNP Assay, WO 2016/154215 A1, published on Sep. 29, 2016.

Tao C, Kumar S, Chien M, Ju J, Single Molecule Electronic Multiplex SNP Assay and PCR Analysis, U.S. 2017/0058335 A1, published Mar. 2, 2017.

Ju J, Cao H, Li Z, Meng Q, Guo J, Zhang S, Yu L, Design and synthesis of cleavable fluorescent nucleotides as reversible terminators for DNA sequencing by synthesis, U.S. 2016/0090621 A1, published Mar. 31, 2016.

Ju J J, Li X, Kumar S, Chen X, Russo J, Chien M, Jockusch S, U.S. Provisional Application No. 62/643,633, filed Mar. 15, 2018.

Zakeri B, Fierer J O, Celik E, Chittock E C, Schwarz-Linek U, Moy V T, Howarth M (2012) Peptide tag forming a rapid covalent bond to a protein, through engineering a bacterial adhesion. *Proc Natl Acad Sci USA* 109:E690-697.

Kumar S, Tao C, Chien M, Hellner B, Balijepalli A, Robertson J W F, Li Z, Russo J J, Reiner J E, Kasianowicz J J, Ju J (2012) PEG-labeled nucleotides and nanopore detection for single molecule DNA sequencing by synthesis. Sci Rep 2:684.

Fuller C W, Kumar S, Porel M, Chien M, Bibillo A, Stranges P B, Dorwart M, Tao C, Li Z, Guo W, Shi Y, Korenblum D, Trans A, Aguirre A, Liu E, Harada E T, Pollard J, Bhat A, Cech C, Yang A, Arnold C, Palla M, Hovis J, Chen R, Morozova I, Kalachikov S, Russo J J, Kasianowicz J J, Davis R, Roever S, Church G M, Ju J (2016) Real-time single-molecule electronic DNA sequencing by synthesis using polymer-tagged nucleotides on a nanopore array. *Proc Natl Acad Sci USA* 113, (19) 5233-5238.

Stranges P B, Palla M, Kalachikov S, Nivala J, Dorwart M, Trans A, Kumar S, Porel M, Chien M, Tao C, Morozova I, Li Z, Shi S, Aberra A, Arnold C, Yang A, Aguirre A, Harada E T, Korenblum D, Pollard J, Bhat A, Gremyachinskiy D, Bibillo A, Chen R, Davis R, Russo J J, Fuller C W, Roever S, Ju J, Church G M (2016) Design and characterization of a nanopore-coupled polymerase for single-molecule DNA sequencing by synthesis on an electrode array. *Proc Natl Acad Sci USA* 113:E6749-E6756.

Ng A H C, Fobel R, Fobel C, Lamanna J, Rackus D G, Summers A, Dixon C, Dryden M D M, Lam C, Ho M, Mufti N S, Lee V, Asri M A M, Sykes E A, Chamberlain M D, Joseph R, Ope M, Scobie H M, Knipes A, Rota P A, Marano N, Chege P M, Njuguna M, Nzunza R, Kisangau N, Kiogora J, Karuingi M, Wagacha Burton J, Borus P, Lam E, Wheeler A R (2018) A digital microfluidic system for serological immunoassays in remote settings. *Science Transl Med* 10 eaar6076.

Chatterji A, Ochoa W, Shamieh L, Salakian S P, Wong S M, Clinton G, Ghosh P, Lin T, Johnson J E (2004) Chemical conjugation of heterologous proteins on the surface of cowpea mosaic virus. *Bioconjugate Chem* 15:807-813.

Derrington I M, Butler T Z, Collins M D, Manrao E, Pavlenok M, Niederweis M, Gundlach J H. Nanopore DNA sequencing with MspA (2010). *Proc Natl Acad Sci USA* 107:16060-16065.

Sanganna Gari R R, Seelheim P, Liang B, Tamm L K (2019) Quiet Outer Membrane Protein G (OmpG) Nanopore for Biosensing. *ACS Sens* 4:1230-1235.

Huang G, Voet A, Maglia G (2019) FraC nanopores with adjustable diameter identify the mass of opposite-charge peptides with 44 dalton resolution. *Nature Communications* 10(1):835.

Wang Y, Gu L Q, Tian K (2018) The aerolysin nanopore: from peptidomic to genomic applications. *Nanoscale* 10(29):13857-66.

Jiang J, Pentelute B L, Collier R J, Zhou Z H (2015) Atomic structure of anthrax protective antigen elucidates toxin translocation. *Nature* 521:545.

Heuck A P, Tweten R K, Johnson A E (2001) Beta-barrel pore-forming toxins: intriguing dimorphic proteins. *Biochemistry* 40(31):9065-73.

Ju J, Li X, Chen X, Kumar S, Russo J, Chien M (2018) 3'-O-modified nucleotide analogues with different cleavable linkers for attaching fluorescent labels to the base for DNA sequencing by synthesis. International Patent Application WO 2018/183538 A1.

Vidal M, Cusick M E, Barabasi A L (2011) Interactome networks and human disease. *Cell* 144:986-998.

Merchant C A, Drndic M (2012) Graphene nanopore devices for DNA sensing. *Methods Mol Biol* 870:211-26.

Rollings R C, McNabb D S, Li J (2012) DNA characterization with ion beam-sculpted silicon nitride nanopores. *Methods Mol Biol* 870:79-97.

Graf M, Lihter M, Thakur M, Georgiou V, Topolancik J, Ilic B R, Liu K, Feng J, Astier Y, Radenovic A (2019) Fabrication and practical applications of molybdenum disulfide nanopores. *Nature Protocols* 14:1130-68.

Shi W, Friedman A K, Baker L A (2017) Nanopore Sensing. *Anal Chem* 89:157-88.

Hall A R, Scott A, Rotem D, Mehta K K, Bayley H, Dekker C (2010) Hybrid pore formation by directed insertion of α-haemolysin into solid-state nanopores. *Nat Nanotechnol* 5:874-877.

Rosenstein J K, Wanunu M, Merchant C A, Drndic M, Shepard K L (2012) Integrated nanopore sensing platform with sub-microsecond temporal resolution. *Nat Methods* 9:487-492.

Ricks K M, Shoemaker C J, Dupuy L C, Flusin O, Voorhees M A, Fulmer A N, Badger C V, Schmaljohn C S, Schoepp R J (2019) Development of a bead-based immunoassay using virus-like particles for detection of alphaviral humoral response. *J Virol Methods* 270:12-17.

Gam L-H (2012) Breast cancer and protein biomarkers. *World J Exp Med* 2:86-91.

Mueller C, Haymond A, Davis J B, Williams A, Espina V (2018) Protein biomarkers for subtyping breast cancer and implications for future research. *Expert Rev Proteomics* 15:131-152.

Lofblom J, Feldwisch J, Tolmachev V, Carlsson J, Stahl S, Frejd F Y (2010) Affibody molecules: engineered proteins for therapeutic, diagnostic and biotechnological applications. *FEBS Lett* 584:2670-2680.

Avibodies™ (2019). Website at http://avipep.com.au/technology/avibodies/.

Tiede C, Bedford R, Heseltine S J, Smith G, Wijetunga I, Ross R, AlQallaf D, Roberts A P, Balls A, Curd A, Hughes R E, Martin H, Needham S R, Zanetti-Domingues L C, Sadigh Y, Peacock T P, Tang A A, Gibson N, Kyle H, Platt G W, Ingram N, Taylor T, Coletta L P, Manfield I, Knowles M, Bell S, Esteves F, Maqbool A, Prasad R K, Drinkhill M, Bon R S, Patel V, Goodchild S A, Martin-Fernandez M, Owens R J, Nettleship J E, Webb M E, Harrison M, Lippiat J D, Ponnambalam S, Peckham M, Smith A, Ferrigno P K, Johnson M, McPherson M J, Tomlinson D C (2017) Affimer proteins are versatile and renewable affinity reagents. Elife 6:e24903

Suderman R J, Rice D A, Gibson S D, Strick E J, Chao D M (2017) Development of polyol-responsive antibody mimetics for single-step protein purification. Protein Expr Purif 134:114-124. Lakhin A V, Tarantul V Z, Gening L V (2013) Aptamers: problems, solutions and prospects. Acta Naturae 5:34-43.

What is claimed is:

1. A method for detecting the presence of a compound of interest in a sample, which comprises:
   a) binding a capture compound or multiple copies of said capture compound for the compound of interest to or near a nanopore;
   b) inserting the nanopore into an electrically resistive barrier;
   c) contacting the capture compound or multiple copies of said capture compound with the sample containing the compound of interest under conditions permitting the compound of interest to attach to the capture compound;
   d) contacting the compound of interest with a tagged compound or multiple copies of said tagged compound under conditions permitting the tagged compound to attach to the compound of interest, wherein the tagged compound comprises at least one tag;
   e) contacting the nanopore with an electrolyte solution and applying a voltage across the electrically resistive barrier; and
   f) measuring the electronic signal change across the pore resulting from at least one tag of the tagged compound entering the nanopore, wherein the tag comprises a polymeric molecule;
wherein the tag further comprises a modification expanding or reducing the diameter of the tag within the nanopore;
thereby detecting the presence of the compound of interest.

2. The method of claim 1, wherein step c) occurs prior to step a); and/or wherein step d) occurs prior to step c); and/or wherein step b) occurs prior to step a).

3. The method of claim 1, wherein the capture compound or multiple copies of said capture compound is attached to the nanopore or near the nanopore; wherein the capture compound is an antibody or antibody mimetic; wherein the tagged compound is an antibody or an antibody mimetic; and/or wherein the compound or compounds of interest is an antigen.

4. The method of claim 3, wherein
a) the antibody mimetic is one of an affibody, avibody, affimer, nanoclamp, a pharmaceutical agent, or a small organic molecule;
b) the tagged compound is an antibody;
c) the tagged compound is an antibody mimetic; and/or
d) the antigen is one of a biomarker, protein, lipid, carbohydrate, DNA, a glycoprotein, a lipoprotein, a virus particle, or other composite molecule.

5. The method of claim 1, wherein the nanopore is a solid state nanopore, and wherein step b) occurs before step a); and/or wherein the electrically resistive barrier comprises a membrane, or a lipid bilayer.

6. The method of claim 1, wherein the nanopore comprises a biological nanopore, wherein the nanopore is α-hemolysin, MspA, or OmpG, or FraC, or Aerolysin, or other transmembrane pore complex of beta-barrel class, or transmembrane pore complex of other class.

7. The method of claim 6, wherein the electrically resistive barrier is a lipid bilayer.

8. The method of claim 1, wherein the nanopore is a hybrid protein-solid state nanopore.

9. The method of claim 1, wherein the polymeric molecule is a polymer comprising one or more of PEG, alkane, peptide, polypeptide, a polynucleotide, or any combination thereof.

10. The method of claim 1, wherein the nanopore comprises an integrated electronic sensor.

11. A method for detecting the presence of a compound of interest in a sample, which comprises:
a) contacting a nanopore with a magnetic bead comprising multiple copies of a capture compound for the compound of interest attached thereto and a binding compound 2 for attachment of the magnetic bead to or near the nanopore via binding compound 1, wherein the binding compound 1 is attached to or near the nanopore, under conditions permitting the magnetic bead to attach to or near the nanopore;
b) inserting the nanopore into an electrically resistive barrier;
c) contacting the capture compounds on the bead with a sample containing the compound of interest under conditions permitting the compound of interest to bind to the capture compounds;
d) contacting the compound of interest with a tagged compound under conditions permitting the tagged compound to attach to the compound of interest, wherein the tagged compound comprises at least one tag;
e) contacting the nanopore with an electrolyte solution and applying a voltage across the electrically resistive barrier; and
f) measuring the electronic signal change across the pore resulting from at least one tag of the tagged compound entering the nanopore,
thereby detecting the presence of the compound of interest.

12. The method of claim 11, wherein step c) occurs before step a); and/or wherein step d) occurs before step c); and/or wherein step b) occurs before step a).

13. A method for determining the presence and/or relative quantities of a plurality of different compounds of interest in a sample, which comprises:
a) contacting a plurality of nanopores with a plurality of different capture compounds,
wherein each capture compound binds to a different compound of interest in the sample,
under conditions such that each capture compound binds to or near one of the plurality of nanopores;
b) inserting the plurality of nanopores in an electrically resistive barrier;
c) contacting the plurality of different capture compounds with the sample comprising the plurality of different compounds of interest under conditions permitting each compound of interest to bind to a capture compound;
d) contacting the plurality of different compounds of interest with a plurality of different tagged compounds,
wherein each tagged compound binds to a different compound of interest,
wherein each tagged compound comprises at least one tag,
wherein each tagged compound comprises a different tag from each other tagged compounds,
wherein the identity of each tagged compound is correlated to the tag,
under conditions such that each tagged compound binds to a compound of interest;
e) contacting the plurality of nanopores with an electrolyte solution and applying a voltage across the electrically resistive barrier;
f) measuring the electronic signal change across each of the plurality of nanopores resulting from at least one tag of the tagged compounds entering the nanopore; and
g) optionally comparing the relative number of each type of tag so detected by a nanopore;
thereby determining the presence and/or relative quantities of the plurality of different compounds of interest in the sample.

14. The method of claim 13, wherein step b) occurs before step a).

15. A method for determining the presence and/or relative quantities of a plurality of different compounds of interest in a sample, which comprises:
a) contacting a plurality of nanopores with a plurality of different capture compounds,
wherein each capture compound binds to a different compound of interest in the sample,
wherein each capture compound comprises at least one tag,
wherein each capture compound comprises a different tag from each other type of capture compounds,
wherein the identity of each capture compound is correlated to the tag,
under conditions such that each capture compound binds to or near one of the plurality of nanopores;
b) inserting the plurality of nanopores in an electrically resistive barrier;

c) contacting the plurality of nanopores with an electrolyte solution and applying a voltage across the electrically resistive barrier;
d) measuring the electronic signal change across each of the plurality of nanopores resulting from at least one tag of each of the capture compounds entering a nanopore, thereby determining the identity of the capture compound attached near or to each nanopore;
e) contacting the plurality of different capture compounds with the sample comprising the plurality of different compounds of interest,
   wherein each compound of interest has the same type of tag attached thereto,
   under conditions permitting each compound of interest to bind to a capture compound;
f) contacting the plurality of nanopores with an electrolyte solution and applying a voltage across the electrically resistive barrier;
g) measuring the electronic signal change across each of the plurality of nanopores resulting from the tag of each of the compounds of interest entering the nanopore; and
h) optionally comparing the relative number of tags detected by a nanopore;
thereby determining the presence and/or relative quantities of the plurality of different compounds of interest in the sample.

16. The method of claim 15, wherein the tag attached to the capture compounds is cleaved after step d).

17. A method for determining a molecular interaction of a biological molecule comprising:
a) attaching the biological molecule or multiple copies of said biological molecule to or near a nanopore;
b) inserting the nanopore in an electrically resistive barrier;
c) contacting the biological molecule with a sample containing putative interacting compound under conditions such that the biological molecule and putative interacting compound interact, and optionally performing a cross-linking step to bind the biological molecule and putative interacting compound;
d) contacting the putative interacting compound with a tagged compound, wherein the tagged compound comprises at least one tag, under conditions permitting the tagged compound to bind to the putative interacting compound;
e) contacting the nanopore with an electrolyte solution and applying a voltage across the electrically resistive barrier; and
f) measuring the electronic signal change across the pore resulting from at least one tag of the tagged compound entering the nanopore,
   wherein the tag further comprises a modification expanding or reducing the diameter of the tag within the nanopore;
thereby detecting the molecular interaction of a biological molecule.

18. The method of claim 17, wherein the step b) occurs before step a); or wherein the biological molecule is attached to the nanopore via a flexible linker; or wherein the tag is attached to the tagged compound via a cleavable linker, and the tag is cleaved from the tagged compound after step d).

19. The method of claim 17, wherein the biological molecule is one of a biomarker, protein, lipid, carbohydrate, DNA, a glycoprotein, a lipoprotein, or other composite molecule such as a virus particle; and/or wherein the putative interacting molecule is one of a biomarker, protein, lipid, carbohydrate, DNA, a glycoprotein, a lipoprotein, a virus particle, or other composite molecule; and/or wherein the tagged compound is one of a biomarker, protein, lipid, carbohydrate, DNA, a glycoprotein, a lipoprotein, a virus particle, or other composite molecule.

20. The method of claim 19, wherein the tag further comprises a modification that changes the charge of the tag; and/or wherein the tag comprises one or more of dSP, C3, $C_n$, PEG, pyrrolidine, spermine, spermidine, nitro pyrrole, nitro indole, nebulazine, benzimidazole, benzene, 7-deazapurine, 5-substituted pysrimidine, fluorescein-dT, fluorescein, rhodamine, ROX, cyanine dye, or any combination thereof.

\* \* \* \* \*